United States Patent
Cirit

(10) Patent No.: US 12,517,115 B2
(45) Date of Patent: Jan. 6, 2026

(54) PERFORMING PHARMACODYNAMICS EVALUATIONS USING MICROFLUIDIC DEVICES

(71) Applicant: Javelin Biotech, Inc., Woburn, MA (US)

(72) Inventor: Murat Cirit, Cambridge, MA (US)

(73) Assignee: Javelin Biotech, Inc., Woburn, MA (US)

( * ) Notice: Subject to any disclaimer, the term of this patent is extended or adjusted under 35 U.S.C. 154(b) by 993 days.

(21) Appl. No.: 17/012,153

(22) Filed: Sep. 4, 2020

(65) Prior Publication Data

US 2022/0074924 A1     Mar. 10, 2022

(51) Int. Cl.
| | |
|---|---|
| *G01N 33/48* | (2006.01) |
| *B01L 3/00* | (2006.01) |
| *C12M 3/00* | (2006.01) |
| *C12N 5/071* | (2010.01) |
| *C12N 5/077* | (2010.01) |
| *G01N 33/50* | (2006.01) |
| *C12M 1/00* | (2006.01) |
| *C12M 1/34* | (2006.01) |

(52) U.S. Cl.
CPC .... *G01N 33/5082* (2013.01); *B01L 3/502715* (2013.01); *C12M 21/08* (2013.01); *C12N 5/0653* (2013.01); *C12N 5/0658* (2013.01); *C12N 5/0686* (2013.01); *C12N 5/0697* (2013.01); *B01L 2200/027* (2013.01); *B01L 2200/0605* (2013.01); *B01L 2200/10* (2013.01); *C12M 23/34* (2013.01); *C12M 41/46* (2013.01)

(58) Field of Classification Search
CPC .......................... B01L 2200/027; C12M 23/16
See application file for complete search history.

(56) References Cited

U.S. PATENT DOCUMENTS

| | | | |
|---|---|---|---|
| 2017/0227525 A1 | 8/2017 | Griffith et al. | |
| 2018/0203005 A1* | 7/2018 | Konry | G01N 33/54346 |
| 2021/0301238 A1 | 9/2021 | Cirit | |

FOREIGN PATENT DOCUMENTS

WO    WO 2019/222559    11/2019

OTHER PUBLICATIONS

Bruner-Tran et al. Exposure to the environmental endocrine disruptor TCDD and humanreproductive dysfunction: Translating lessons from murine models. Reproductive Toxicology 68 (2017) 59-71 (Year: 2017).*
Byrnes & Weigl. Selecting analytical biomarkers for diagnostic applications: a first principles approach. Expert Review of Molecular Diagnostics, 2018 vol. 18, No. 1, 19-26 (Year: 2018).*
Ogata et al. Acute Liver Failure with Diffuse Liver Metastasis from Breast Cancer, Not Detected by Computed Tomography: 2 Case Reports. Sep.-Dec. 2018; 11(3): 699-704. (Year: 2018).*
Saad et al. Renal Hypertrophy in Liver Failure. Kidney Int Rep. Jul. 6, 2018;3(6):1464-1467. (Year: 2018).*
Zhang et al. Ultrasound hepatic/renal ratio and hepatic attenuation rate for quantifying liver fat content. World J Gastroenterol. Dec. 21, 2014;20(47):17985-92. (Year: 2014).*
Mukhtar et al. Clinically Meaningful Tumor Reduction Rates Vary by Prechemotherapy MRI Phenotype and Tumor Subtype in the I-SPY 1 Trial (CALGB 150007/150012; ACRIN 6657. Ann Surg Oncol. 2013; 20(12): 3823-3830. Published online Jun. 19, 2013.. (Year: 2013).*
Miyoshi et al. Kidney Organoids in Translational Medicine: Disease Modeling and Regenerative Medicine. (Dev Dyn. Jan. 2020;249 (1): 34-45. Published online Mar. 26, 2019. (Year: 2019).*
Wolf DC. Evaluation of the Size, Shape, and Consistency of the Liver. In: Walker HK, Hall WD, Hurst JW, editors. Clinical Methods: The History, Physical, and Laboratory Examinations. 3rd ed. Boston: Butterworths; 1990. Chapter 94. PMID: 21250261 (Year: 1990).*
Mencattini, Arianna, et al. "From petri dishes to organ on chip platform: The increasing importance of machine learning and image analysis." Frontiers in pharmacology 10 (2019): 100.*
International Preliminary Report on Patentability in International Appln. No. PCT/US2021/048885, mailed on Mar. 16, 2023, 11 pages.
International Search Report and Written Opinion in International Appln. No. PCT/US2021/48885, dated Feb. 28, 2022, 14 pages.
Invitation to Pay Additional Fees and, Where Applicable, Protest Fee in International Appln. No. PCT/US2021/48885, dated Nov. 16, 2021, 2 pages.
Maass et al., "Multi-functional scaling methodology for translational pharmacokinetic and pharmacodynamic applications using integrated microphysiological systems (MPS)," Integrative Biology, Apr. 18, 2017, vol. 9, No. 4, pp. 290-302.
Sasserath et al., "Differential Monocyte Actuation in a Three-Organ Functional Innate Immune System-on-a-Chip," Advanced Science, Published Jun. 2, 2020, vol. 7, article 2000323, pp. 1-19.

* cited by examiner

*Primary Examiner* — Anna Skibinsky
(74) *Attorney, Agent, or Firm* — Fish & Richardson P.C.

(57) ABSTRACT

Microfluidic platforms including multiple microphysiological systems. At least one of the platforms include: at least one inlet; a plurality of organ constructs, each organ construct of the plurality of organ constructs being sized relative to other organ constructs of the plurality of organ constructs based on at least one predetermined human pharmacokinetic (PK) parameter; and a plurality of channels, each channel of the plurality of channels causing an organ construct of the plurality of organ constructs to be in fluidic communication with at least one other organ construct of the plurality of organ constructs.

20 Claims, 10 Drawing Sheets

PERFORMING PHARMACODYNAMICS EVALUATIONS USING MICROFLUIDIC DEVICES

FIELD OF THE INVENTION

This disclosure generally relates to microfluidic devices.

BACKGROUND

A microphysiological system (MPS) can include a single tissue construct or an interconnected set of two-dimensional (2D) or three-dimensional (3D) cellular constructs that are frequently referred to as organs-on-chips, tissue chips, or in vitro organ constructs. The constructs are typically made with immortalized cell lines, primary cells from animals or humans, or organ-specific cells derived from naïve cells, human embryonic stem cells, and induced pluripotent stem cells (iPSCs). Individually, each construct can be designed to recapitulate the structure and function of a human organ or organ region, paying particular attention to the cellular microenvironment and cellular heterogeneity. When coupled together to create an MPS, these constructs offer the possibility of providing, in vitro, an unprecedented physiological accuracy for the study of cell-cell, drug-cell, drug-drug, and organ-drug interactions, if drug dynamics (e.g., drug interaction with tissue) can be properly modeled.

Pharmacokinetics (PK) is a branch of pharmacology dedicated to determining the fate of substances administered to a living organism. Typically, the substances of interest can include any chemical xenobiotic such as: pharmaceutical drugs, pesticides, food additives, cosmetics, and so forth. In some cases, PK attempts to analyze chemical metabolism, absorption, metabolism, biodistribution, and/or excretion, and attempts to discover the fate of a chemical from the moment that it is administered up to the point at which it is eliminated from the body. In general, PK studies can give insight as to how an organism processes a drug.

Pharmacodynamics (PD) refers to the study of the biochemical and physiologic effects of drugs (for example, pharmaceutical drugs). The effects can include those manifested within animals (including humans), microorganisms, or combinations of organisms (for example, infection). Pharmacodynamics places particular emphasis on dose-response relationships, that is, the relationships between drug concentration and effect. Generally, PD studies can give insight as to how a drug affects one or more diseases in an organism.

PK/PD modeling is a technique that combines the two classical pharmacologic disciplines of pharmacokinetics and pharmacodynamics. It integrates a pharmacokinetics and a pharmacodynamics model component into one set of mathematical expressions that allows the description of the time course of effect intensity in response to administration of a drug dose.

SUMMARY

The systems and methods described in this specification can be used to provide a solution to the previously mentioned disadvantages. In some implementations, a method of designing a multiple-MPS platform is described. The method can include physically designing several individual MPSs, causing a drug to interact with each MPS to generate a concentration profile for each MPS, using the concentration profiles to estimate a plurality of PK parameters and PD responses (for example, coefficients related to gut permeability, hepatic clearance, renal excretion, volume of distribution, and so on) independently of the design specifications of the individual MPSs, using the PK/PD parameters to determine design parameters for a multi-MPS platform, and designing a multi-MPS platform using the design parameters. The method can facilitate optimizing the multi-MPS platform such that each MPS of the platform are designed relative to each other to replicate known in-human PK/PD profiles. The resulting MPS platform can also include channels that connect each MPS with at least one other MPS to facilitate a continuous circulated flow of a drug between the MPSs. The method can design each channel to facilitate flow rates, flow patterns, and flow partitioning such that the platform, as a whole, is optimized to replicate known in-human PK/PD profiles. In some implementations, the resulting MPS platform includes either single pass flow channels or recirculating flow channels (or a combination of both) that facilitate the application of fluid shear stress to at least some of the MPSs. The applications of fluid shear stress to an MPS can stimulate cellular responses that can be important for, as an example, endothelial cell function and are atheroprotective, and can facilitate differentiation of cells during cell culturing.

In some implementations, a method of performing PK analysis using a multi-MPS platform is described. The method can include causing a drug to flow through the platform to cause the drug to interact with each of the MPSs of the MPS platform. Samples of the MPSs are collected at several time points and, for each sample, the drug can be quantified using, for example, mass spectrometry. Based on the drug quantification, in-vitro PK profiles (concentration/time) can be generated. Based on these PK profiles, in-vitro PK parameters (for example, clearance, permeability, and so forth) can be determined. The in-vitro PK parameters can be translated to human PK parameters using computational modeling and, in some implementations, machine learning.

In some implementations, once the drug interacts with the MPSs, the PD responses of the tissue construct can be assessed by collecting and analyzing the media samples from the MPS (e.g., performing protein detection by enzyme-linked immunosorbent assay (ELISA)), by visualizing of the tissue construct on chip (e.g. by immunohistochemistry (IHC)), by extracting the tissue construct (sacrificial), such as by RNA sequencing or metabolomics, and/or by using biosensors (e.g. oxygen, pH and multi-electrode array sensors).

In a general aspect, a process for testing or designing a microphysiological system (MPS) includes obtaining at least one organ construct corresponding to an organ type of a plurality of organ types. The process includes generating, in the at least one organ construct, a disease having a disease type. The process includes selecting a pharmacodynamics (PD) biomarker in the at least one organ construct based on the disease type of the disease. The process includes causing an interaction between a molecular compound and the at least one organ construct. The process includes generating at least one PD parameter representing a response of the PD biomarker in the at least one organ construct to the interaction between the molecular compound and the at least one organ construct. The process includes determining, based on the at least one PD parameter, at least one design parameter. The process includes designing a multi-organ construct platform based on the at least one design parameter.

In some implementations, the process includes parameterizing the at least one PD parameter associated with the organ construct. The process includes, based on the parameterizing, computationally scaling the PD parameter to approximate a human organ represented by the organ construct.

In some implementations, generating, in the at least one organ construct, the disease having the disease type includes inducing a disease in the organ construct by applying an exogenous molecules to the organ construct or by causing cross-talking between the organ construct and another organ construct. In some implementations, generating, in the at least one organ construct, the disease having the disease type includes introducing one or more diseased cells to the organ construct.

In some implementations, the at least one design parameter is determined based on the disease type. In some implementations, the at least one organ construct comprises at least two tissue types. In some implementations, the at least one organ construct comprises two or more compartments, wherein a compartment of the two or more compartments comprises an integrated biosensor.

In some implementations, the integrated biosensor comprises one or more of a biochemical sensor and an electrochemical sensor.

In some implementations, the process includes determining, based on the PD parameter, a dose-response curve relating an amount of the molecular compound to a change in the PD biomarker. In some implementations, the PD parameter represents one of a change in tissue size.

In some implementations, the disease type comprises cancer and the at least one organ construct comprises cancerous cells. In some implementations, the disease type comprises Parkinson's disease and the at least one organ construct comprises neurons. In some implementations, the disease type comprises a neuroinflammatory disease and the at least one organ construct comprises brain cells. In some implementations, the disease type comprises non-alcoholic steatohepatitis and wherein the at least one organ construct comprises one or more of liver cells, adipose cells, and pancreas cells.

In some implementations, generating the at least one PD parameter comprises analyzing the interaction between the molecular compound and the at least one organ construct using at least one ordinary differential equation.

In some implementations, the process includes determining, for the at least one organ construct, at least one design parameter of that organ construct, wherein the at least one design parameter is determined based on the disease type.

In some implementations, the process includes obtaining, based on the interaction between a molecular compound and the at least one organ construct, at least one pharmacokinetic (PK) parameter for the organ construct. In some implementations, the at least one design parameter is based on the at least one PK parameter for the at least one organ construct. In some implementations, the process includes determining, for the at least one organ construct, a concentration profile based on the interaction between a molecular compound and the at least one organ construct. In some implementations, at least one PK parameter for the organ type of the plurality of organ types is based on the concentration profile. In some implementations, determining at least one design parameter comprises determining a relative tissue size and volume in an MPS between the at least one organ construct and another organ.

In some implementations, the at least one PK parameter comprises at least one of: a clearance, a permeability, and a volume of distribution.

In some implementations, the at least one organ construct comprises at least one of: a gastrointestinal tract organ construct, a liver organ construct, a kidney organ construct, a muscle organ construct, or an adipose organ construct.

In some implementations, the molecular compound comprises a xenobiotic.

In some implementations, the at least one design parameter comprises at least one of: a volume of the at least one organ construct, a surface area of the at least one organ construct, a number of cells of the at least one organ construct, an arrangement of cells of the at least one organ construct, a flow pattern through the at least one organ construct, a volume of at least one channel, a flow rate, and a flow partitioning value.

In some implementations, the process includes applying an ordinary differential equation (ODE) model to the at least one PD parameter based on in vitro experimental data. The process includes translating, based on applying the ODE model, the at least one PD parameter to PD profile data representing an in vivo PD result. In some implementations, the process includes applying an ordinary differential equation (ODE) model to at least one PK parameter, in addition to the PD parameter, based on in vitro experimental data. In some implementations, the process includes translating, based on applying the ODE model, the at least one PK parameter to PK profile data representing an in vivo PK result in addition to the in vivo PD result.

In a general aspect, a system includes at least one inlet, a plurality of organ constructs, at least one organ construct of the plurality including a disease, wherein a pharmacodynamics (PD) biomarker in the at least one organ construct is selected based on a disease type, and wherein the at least one organ construct is sized relative to other organ constructs of the plurality of organ constructs based on at least one predetermined human pharmacokinetic (PK) parameter and based on the disease type. The system includes a sensor for monitoring changes of the PD biomarker. The system includes a plurality of channels, each channel of the plurality of channels causing an organ construct of the plurality of organ constructs to be in fluidic communication with at least one other organ construct of the plurality of organ constructs.

In some implementations, the plurality of channels is configured to cause a molecular compound to flow through the system at a circulation flow rate to distribute the molecular compound at a particular distribution rate.

In some implementations, the plurality of organ constructs comprises at least one gastrointestinal tract organ construct, at least one liver organ construct, at least one kidney organ construct, and at least one of a muscle organ construct or an adipose organ construct.

In some implementations, the plurality of organ constructs comprises at least one of: a gastrointestinal tract organ construct, a liver organ construct, a kidney organ construct, a muscle organ construct, or an adipose organ construct.

In some implementations, each of the plurality of organ constructs comprises at least one of: an apical compartment and a basolateral compartment.

In some implementations, at least a portion of the plurality of channels are configured to cause a fluid to continuously circulate between at least a portion of the plurality of organ constructs.

In some implementations, at least one second channel in fluidic communication with at least one organ construct of the plurality of organ constructs and configured to facilitate fluidic flow in the at least one organ construct.

These and other aspects, features, and implementations will become apparent from the following descriptions, including the claims.

Implementations of the present disclosure can provide one or more of the following advantages. When compared with conventional techniques, implementations of the systems described in this disclosure can: be designed to better replicate in vivo (e.g., human) biological systems enable the study of organ-specific contribution to pharmacokinetics and pharmacodynamics; incorporate organ-to-organ crosstalk; provide enough media volume for frequent sampling to determine PK profiles and evaluate PD responses; facilitate recirculation of media to enable the study of PK associated with both drugs that are cleared slow and drugs that are cleared quickly and monitor PD biomarkers for diseased tissue; enable PK studies while each organ construct is simultaneously contributing to the PK profile; be scaled based on individual MPS function relevant to PK and PD responses; and incorporate proper mechanical cues, such as shear stress on gut and kidney organ constructs. Implementations of the systems and methods described in this disclosure can: provide in vitro results that are more accurately translated to predicted in vivo results; facilitate designing MPS platforms that are optimized for a specific function; estimate "first in human" dosing regimens; and provide faster PK/PD analysis.

MPSs can provide numerous benefits to pre-clinical drug development. The term MPSs can encompass a range of compositionally complex (for example, more than one cell type) and three dimensional (3D) cell cultures that are dynamically perfused, thus capturing more features of human organ or tissue function compared to the traditional static 2D cell cultures. The use of microfluidic platforms can facilitate in vitro re-creation of the mechanical, fluidic, spatial, and chemical stimuli and cues that a tissue may be exposed to in vivo. In some implementations, micro-machined biomimetic reactor platforms facilitate in vitro recreation of these stimuli. To better recapitulate human physiology at a systemic level and establish better pharmacologic pre-clinical models that translate more accurately to human outcomes, multi-MPS platforms can be designed to interconnect several MPSs representing facets of different organs together and thus allow organ-organ interaction and cross-signaling. In many cases, single MPS and multiple MPS platforms can be designed to mimic specific organ functions, microarchitecture, and organ-organ crosstalk relevant to a biological question of interest.

MPSs have the potential to offer means for exploring the PK properties of a drug and evaluate PD responses of diseased tissue pre-clinically. For such investigations, the integration of gut and liver MPSs may be important as these two organs can play a central role on the biodistribution and bioavailability of an orally administered compound (through processes such as intestinal permeability and hepatic metabolism). The multi-MPS platform described herein is not limited to materials that non-specifically adsorb lipophilic compounds during PD/PK analysis. For example, materials such as thermoplastics (e.g., polycarbonate, COC, or COP) can be used to make the MPS. In some implementations, elastomers such as polydimethylsiloxane (PDMS) can be used, or a combination of thermoplastics, elastomers, and/or glass can be used to form the MPSs. The multi-MPS platform is configured to use a relatively high culture volume and cell numbers that can boost the output biological signal and the collection of high-content measurements, relative to conventional MPS platforms. The multi-MPS platform can allow continuous access to the MPS compartments for direct and frequent sampling of circulating drugs/metabolites, and thus data-rich quantitative PK/PD profiles across all platform compartments cannot always be obtained. The multi-MPS platform can be coupled with a mathematical modeling (e.g., machine learning) methodology to identify the biology-related parameters (for example, intestinal permeability, intrinsic hepatic clearance, and so forth) from system-specific processes and parameters (for example, flow rates, surface areas). Generally, the machine learning process includes mechanistic (e.g., ordinary differential equation (ODE) based) modeling such as quantitative systems pharmacology (QSP) or physiologically-based pharmacokinetic PBPK modeling. The parameters associated with each MPS of the multi-MPS platform are decoupled based on the ODE-based) models. The mathematical models (e.g., machine learning models) are used for in vitro to in vivo translation of the PK/PD parameters.

DETAILED DESCRIPTION

Figure 1:
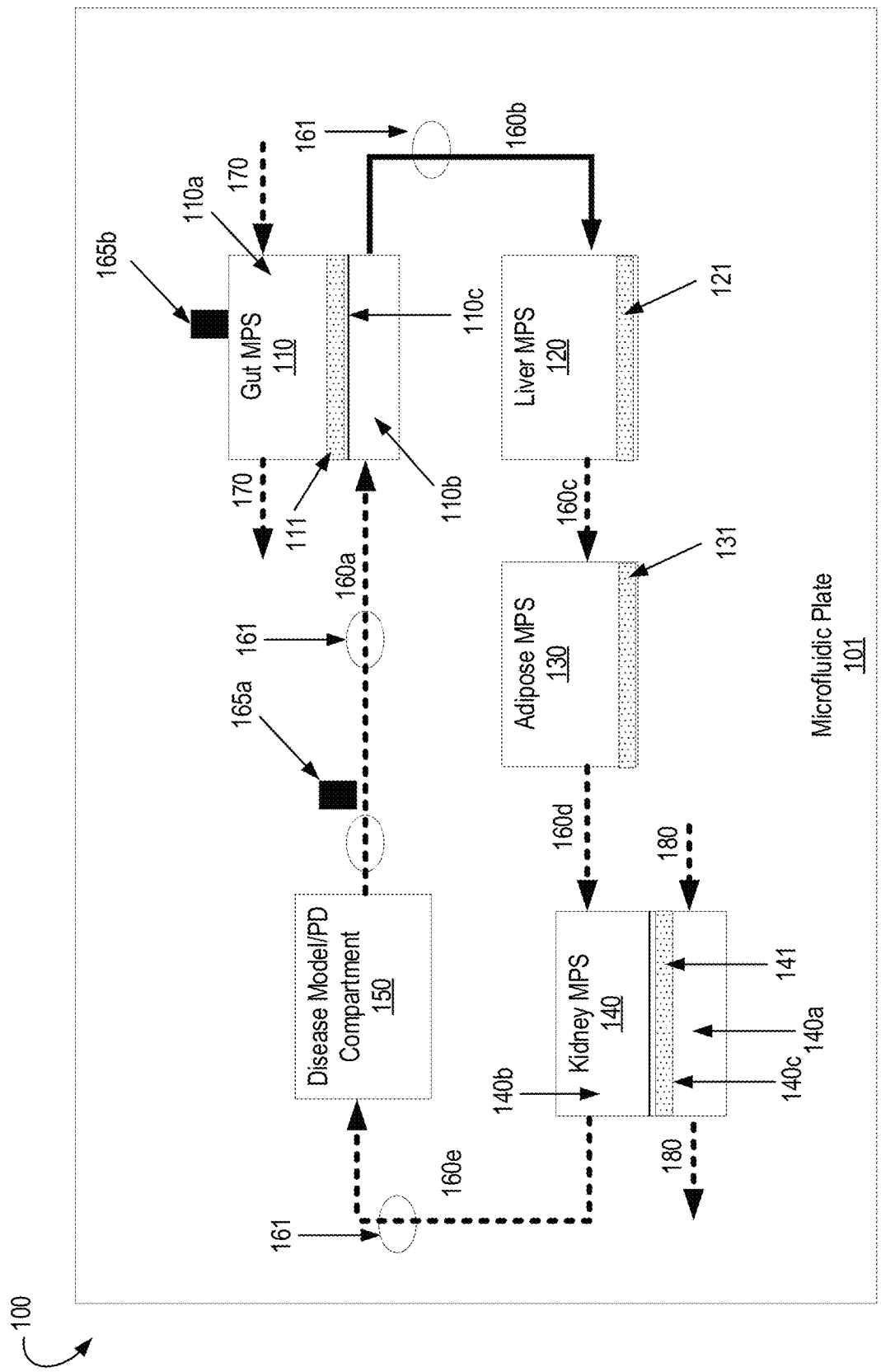
FIG. 1 is a block diagram illustrating an example multi-MPS platform.

FIG. 1 is a block diagram illustrating an example multi-microphysiological system (MPS) platform 100. The multi-MPS platform 100 includes a plurality (e.g., at least two) MPSs, which are referred to as organ constructs and organ-on-chips (OOC) in this specification. The multi-MPS platform 100 is configured for performing pharmacodynamics (PD) evaluations of various compounds (e.g., drugs) in MPSs (e.g., MPS 110, 120, 130, 140, and 150) representing organ constructs. The multi-MPS platform 100 includes at least two MPS (also called chips, compartments, or components). The MPSs 110, 120, 130, 140, and 150 of the multi-MPS platform 100 are in fluid communication with one another. The multi-MPS platform 100 is configured to include an environment for hosting a disease, such as a disease MPS 150. The multi-MPS platform 100 is configured to test one or more PD responses of the disease to treatments in to the multi-MPS platform 100. In some implementations, the multi-MPS platform 100 can be designed specifically to test a particular PD response, as subsequently described.

At least one MPS of the multi-MPS platform 100 is configured to host a disease. A disease hosted by the disease MPS 150 can include a disease found in human tissue or cells that are emulated by the MPSs of the multi-MPS platform 100. For example, the disease MPS 150 includes a compartment for emulation of tissue or organ dysfunctions observed in diseases. In some implementations, the diseases emulated are human diseases. For example, the disease MPS 150 can emulate insulin resistance in a human liver, a reduced insulin production in a human pancreas, and so forth. Additional examples of diseases for which PD responses can be evaluated are subsequently described.

The disease MPS 150 is designed to evaluate PD responses by the emulated cells or tissue in response to application of compounds, such as drugs, to the emulated cells or tissue. The disease MPS 150 can be designed specifically to test a particular PD response. In an example, the disease MPS 150 is designed using diseased cells/tissues obtained from donors (e.g. a tumor biopsy). In an example, the PD response is evaluated by the multi-MPS platform 100 by inducing a disease in the disease MPS. For example, Parkinson's disease can be induced in the disease MPS 150 by performing a neurotoxin treatment of healthy brain MPS. The disease MPSs generally can be unicellular, multi-cellular, or multi-tissue type. For example, the disease MPS 150 modeling a cancer may contain only cancer cells. In another example, a disease MPS 150 modeling Parkinson's disease may include neurons. In another example, a disease MPS 150 modeling microglia or astrocytes of the brain can include neurons. In an example, a disease MPS 150 modeling non-alcoholic steatohepatitis (NASH) includes liver, adipose and/or pancreas cells.

Diseased cells can be obtained in various ways. Generally, rare diseases can be modeled by differentiating from stem cells from patients to the relevant cell/tissue type for including in one or more MPSs of the multi-MPS platform 100. Alternatively, primary cells and/or immortalized cell line be used as sources for tissue in the MPSs. Generally, a stem-cell line is distinctly different from an immortalized cell line, such as the HeLa line. Generally, primary cells are cells that have been isolated and then used relatively quickly (e.g., immediately). In some implementations, tissue including various genetic diseases can also be obtained using stem cell differentiations. Types of diseased can include (but is not restricted to) metabolic diseases of liver tissue such as hepatocytes, Kupffer, Stellate, and liver sinusoidal endothelial cells (LSEC). Types of disease acquisition can include adipose tissue disease such as preadipocytes and adipocytes. Types of diseased cells can include skeletal muscle diseases including myoblasts, myotubes. Types of diseased cells can include pancreas tissue such as pancreatic alpha and beta cells. Cancerous cells can be obtained from patient biopsies. Neurodegenerative diseased tissue can be obtained from neurons (dopaminergic, medium spiny etc.), astrocytes, pericytes, endothelial cells, microglia, oligodendrocytes and so forth. Diseases can include nephrology obtained from proximal tubules (proximal tubular endothelial cells) and/or glomerulus (podocytes). Diseases can include lung diseases in the airway obtained from endothelial cells. Diseases can include inflammatory/immune diseases obtained from circulating immune cells, and T-cells. Diseases can include osteoarthritis and rheumatoid arthritis obtained from mesenchymal stem cells, cartilage (e.g., chondorcytes), or bone (e.g., osteoblasts, osteoclasts, and osteocytes). Diseases can include cardiovascular diseases in blood vessels obtained from endothelial cells, cardiac tissue (e.g., cardiomyocytes), and so forth. Any of these diseases can be hosted in the disease MPS 150 and/or various MPSs 110-140.

The disease MPS 150 may include multiple compartments in the same chip or system. In an example, to capture a disease phenotype, multiple compartments are included in the disease MPS 150. The multiple compartments can allow for differentiation among cell types in the disease MPS 150. The multiple compartments can be used to include an integrated biosensor in the disease MPS 150 to monitor the PD response. For example, the biosensor can include one or more of an oxygen sensor, a micro-array of electrodes (e.g., for monitoring neurological responses), a immunosensor, an electrochemical sensor, a magnetic biosensor, a thermometric biosensor, an acoustic biosensor, an optical biosensor, a glucose sensor, and so forth. For example, an electrochemical biosensor can measure a pontentiometric response of the tissue or cells. The electrochemical biosensor can measure an amperometric response due to reduction or oxidation of electroactive species. In some implementations, sensors can measure $O_2$ levels, pH levels, lactate, glucose, nitric oxide, and levels of similar molecules in the media of the MPS. In some implementations, biosensors are configured to monitor the changes in the tissue, such transepithelial/transendothelial electrical resistance (TEER) to measure the integrity of tight junction dynamics in cell culture models of endothelial and epithelial monolayersas, such as to monitor barrier function (e.g., using conductivity sensors). In some implementations, the sensors include microelectrode arrays (MEA) for measuring neural function (e.g., including electrochemical sensors).

The PD response can be used to computationally determine physical characteristics of the disease MPS (e.g., chip design criteria). Generally, the physical characteristics of the disease MPS 150 design are determined based on features such as physiological features and functional features, as subsequently described. Generally, mechanistic computational algorithms (e.g., PBPK and/or QSP as previously described). Design parameters, (e.g., volumes, size, flow rate, and so forth) in mechanistic models are generally determined with optimization algorithms, subsequently described.

In some implementations, a machine-learning process can be configured to determine the design of the physical characteristics of the disease MPS 150. Examples of these physical characteristics are subsequently described in detail, and can include aspects such as size or geometry of the disease MPS 150, including organ size. These disease MPS 150 design criteria can include which function or dysfunction are induced for the organ of the disease MPS 150. The disease MPS 150 design criteria include how to circulate biomarker profiles for the PD response (e.g., insulin levels for modeled diabetes). For designing the disease MPS 150, a computing system (such as those described in relation to FIGS. 9-10, below) process data representing physiological features that are related to known disease phenotypes in human. For example, a relative size of the disease tissue to human body (e.g., a scaling factor) can be considered when analyzing the PD response. Additionally, a computing system can process data representing functional features of the disease MPS 150. Functional features can be related to known functions and/or dysfunctions of a tissue. For example, functions of tissue can include cytokine release by immune cells, which affects a NASH phenotype.

Generally, physiological and functional features are associated with the disease MPS 150 based on the cell-types, microenvironment (e.g., cell-to-cell ratio, compartment volume, etc.) in the disease MPS and disease pathophysiology. These features can be monitored on the tissue constructs, such as neural electrophysiology changes for neurodegenerative diseases. In some implementations, certain biomarker expressions are monitored on the tissue, such as alpha-synuclein accumulation (Lewy body formation) during Parkinson's disease. Another example of a feature that is monitored could be collagen deposition in NASH, or cardiomyocyte contractility in cardiovascular diseases. Additionally, these markers are secreted and can be detected in the media. For example, reactive oxygen species (ROS) in neurodegenerative diseases can be detected, as can adipokines and hepatokines for NASH, cytokines in inflammatory diseases, and/or insulin levels for diabetes. The particular marker and its levels are considered features for the model. Generally, these features can be optimized by modulating the microenvironment, such as altering the values from cell-to-cell (e.g., hep-to-Kupffer ratio, compartment volume, flow rates, shear stress, media formulation etc.).

Generally, the multi-MPS platform 100 is configured for investigation of PK properties in addition to PD evaluations. The multi-MPS platform 100 design criteria are computationally determined using both PK and PD features. Generally, PK-relevant MPSs are the primary drivers of drug kinetics in the multi-MPS platform 100. For example, for connected gut-liver MPSs (e.g., the MPS 110 and MPS 120 of FIG. 1), a function of the gut MPS 110 includes drug absorption, and a function of the liver MPS 120 includes drug metabolism. The PK parameters obtained from PK-relevant MPSs (e.g., MPSs 110, 120, 130, and 140 of FIG. 1) are used by a computing system for estimating MPS design specifications (e.g., compartment volume, tissue size, flow rates, and so forth). Generally, a computing system is configured to emulate drug kinetics in the multi-MPS platform 100 that are representative of response in a human. The drug kinetics are emulated when drugs are run on the multi-MPS platform 100. The drug exposure on the multi-MPS platform 100 represents human drug exposure. In other words, each a MPS of the multi-MPS platform 100, other than the disease MPS 150, is configured to emulate functionality of an organ or tissue, such as human organ or organ tissue, when a compound (such as a drug compound) is applied to the human organ or organ tissue.

Investigation of the PK properties and PD tissue response for a drug can be particularly important during pre-clinical drug development, as it may facilitate decision-making regarding the dosage regimen in early-phase clinical studies. Animal species are often used to study the PK and PD of a compound under development. However, such studies can be costly, can be considered unethical, and often fail to accurately capture the human phenotype. In vitro systems can be developed and employed to investigate the absorption, distribution, metabolism, and excretion (ADME) of a compound. Although these systems have been extremely valuable in drug development, they are not without limitations and the need for more physiologically realistic and better predictive in vitro models is widely recognized. The multi-MPS platform 100 is configured for simultaneous determination of PK parameters and evaluation of PD responses for a disease introduced to the multi-MPS platform 100.

Continuing in reference to FIG. 1, the platform 100 includes a microfluidic plate 101. In some implementations, the microfluidic plate 101 is at least partially constructed from thermoplastics (e.g., polycarbonate, polystyrene, COC, etc.). Generally, it is possible to use multiple plastics types, but a single plastic type is sufficient to manufacture the MPSs. Generally, thermoplastics also reduced non-specific binding (adsorption) of small molecules. The microfluidic plate 101 includes a plurality of MPSs 110-150. In the illustrated implementations, the plurality of MPSs 110-150 include a gut MPS 110, a liver MPS 120, an adipose MPS 130, a kidney MPS 140, and the disease modeling MPS 150. The MPSs 110-140 are in fluidic communication with the disease model MPS 150. Generally, the MPSs 110-150 model organ constructs, wherein the MPSs 110-140 include healthy tissue and wherein the disease MPS 150 includes diseased tissue. The MPSs 110-150 together can be used to determine PK parameters and evaluate a PD response of the disease MPS 150. Although certain organ constructs are described with respect to the illustrated implementation, other organ constructs can be used in some implementations. In some implementations, the plurality of MPSs include one or more muscle MPSs and/or one or more skin MPSs in addition to the described MPSs of the illustrated implementation or alternative to one or more of the described MPSs of the illustrated implementation.

Generally, a membrane is laminated into each microfluidic device, and the tissue or cells are seeded on the microfluidic device. The membrane generally is not removed from the system, while the tissue can be analyzed when on device or can be extracted for analysis. Each of the plurality of MPSs 110-150 can include a number of cells (that is, a number of cells and cell types) specific to an organ corresponding to that MPS. In some implementations, the gut MPS 110 corresponds to the esophagus, stomach, and/or pancreas, and includes one or more cells 111 (that is, cells and cell types) typically found in such organs, such as epithelial cells, enterocytes, mucin-producing goblet cells, primary monocyte-derived dendritic cells, immune cells and so forth. In some implementations, the liver MPS 120 corresponds to the liver and includes one or more cells 121 typically found in the liver, such as hepatocytes, fibroblasts, Kupffer cells, liver sinusoidal endothelial cells (LSECs), hepatic stellate cells, stroma, and so forth. In some implementations, the adipose MPS 130 corresponds to the adipose organ and includes one or more cells 131 typically found in the adipose organ, such as adipocytes. In some implementations, the Kidney MPS 140 corresponds to the kidney organ and includes one or more cells 141 typically found in the kidney, such as kidney glomerulus parietal cells, glomerulus podocytes, kidney proximal tubule brush border cells, collecting duct intercalated cells, and so forth. As previously described, the disease MPS 150 includes diseased tissue, which can be selected based on the particular PD response being evaluated.

The inclusion of MPSs 110-140 with MPS 150 is based on the PD response being evaluated in the PK/PD multi-MPS platform 100. For example, when modeling Parkinson's disease, one or more of the gut MPS 110, the liver MPS 120, the adipose MPS 130, or the kidney MPS 140 can be removed if they are not needed in evaluating the PD response.

In some implementations, one or more of the plurality of MPSs 110-140 include two or more compartments separated by a porous membrane. In the illustrated implementation, the gut MPS 110 includes an apical compartment 110a and a basolateral compartment 110b that are separated by a porous membrane 110c. The compartments 110a, 110b can approximate the absorption and filtering functions, for example, epithelial cells. As will be described later, a molecular compound (for example, a buffer including a drug) can be added to the gut MPS 110 through the apical compartment 110a, in which it interacts with the one or more cells 110 (for example, epithelial cells), which can be attached to the porous membrane 111, and then at least a portion of the molecular compound can be absorbed in the basolateral compartment 110b and flow out of the gut MPS 110 to begin circulation through the platform 110. In some implementations, the apical compartment 110a includes epithelial cells, and the basolateral compartment 110b includes immunity cells (for example, macrophages). Also, in the illustrated implementation, the kidney MPS 140 includes an apical compartment 140a and a basolateral compartment 140b separated by a porous membrane 140c. These compartments 140a, 140b can be configured to replicate the clearance function of the kidney organ. The basolateral compartment 140b can receive the molecular compound as it circulates through the platform 100, and at least a portion of the molecular compound (and media) can move through the porous membrane 140c while interacting with the one or more cells 141, which can be attached to the porous membrane 140c in the apical compartment 140a. In some implementations, the disease MPS 150 can include two or more compartments, similar to one or more of MPSs 110-140. The multiple compartments can be used to model multiple cell types or tissue types, as previously described.

The microfluidic plate 101 includes a plurality of channels 160a-d. Each of the channels 160a-d are configured to cause each of the plurality of MPSs 110-150 to be in fluidic communication with at least one other MPS of the plurality of MPSs 110-150. In the illustrated example, a first channel 160e provides fluidic communication between the kidney MPS 140 and the disease MPS 150, a second channel 160a provides fluidic communication between the disease MPS 150 and the gut MPS 110, a third channel 160b provides fluidic communication between the gut MPS 110 and the liver MPS 120, a fourth channel 160c provides fluidic communication between the liver MPS 120 and the adipose MPS 130, and a fifth channel 160d provides fluidic communication between the adipose MPS 130 and the kidney MPS 140. Each of the plurality of channels 160a-160d can include one or more pumps 161 to facilitate flow through the channels 160a-160d and MPSs 110-140.

As shown, the plurality of channels 160a-d are designed to provide a circular flow of a molecular compound in a media or buffer (for example, a drug in a media or buffer) between the MPSs of the plurality of MPSs 110-150. In some implementations, the plurality of channels 160a-d are designed to cause the drug to flow between the MPSs of the plurality of MPSs 110-150 at a predetermined system level flow rate. In some implementations, a system level flow rate describes a rate at which a portion of a drug sample flows from the gut MPS 110, to the rest of the MPSs 120-150, and back to the gut MPS 110. In some implementations, each of the plurality of channels 160a-d are individually designed to have different flow rates which, in combination, equal the system level flow rate. That is, the first channel 160a can cause a media or buffer (with or without a drug) to flow between the kidney MPS 140 to the gut MPS 110 at a first flow rate, while the second channel 160b can cause the drug sample to flow between the gut MPS 110 and the liver MPS 120 at a second flow rate that is different than the first flow rate.

In some implementations, the microfluidic plate 101 includes single pass channels 170, 180 to cause fluids to flow through one or more of the plurality of MPSs 110-150 in a non-circulatory manner. While single pass channels 170, 180 are shown, the apical flow can be either be single pass or recirculation (e.g., channels 160). In the illustrated implementation, the microfluidic plate 101 includes a first single pass channel 170 to cause fluids to flow through the gut MPS 110 and a second single pass channel 180 to cause fluids to flow through the kidney MPS 140. The single pass channels 170, 180 can facilitate apply fluid shear stress to the cells of the MPS, which can be helpful in stimulating cellular responses that can be important for, as an example, endothelial cell function and are atheroprotective, and cellular differentiation during cell maturation. Although described as non-circulatory in the illustrated implementation, in some implementations, one or more of the channels 170, 180 can be configured to cause fluids to flow through one or more of the plurality of MPSs 110-140 in a circulatory manner.

Generally, single pass and/or circulatory channels 160, 170, 180 are applied to the disease MPS 150 (or other MPSs for PD analysis) to provide shear stress for relevant tissue constructs. Single pass channels can be used to collect samples from the either MPSs during the experiment (e.g. to evaluate PD responses from the media samples). Single pass channels can be used to introduce drugs to the systems (e.g. intratumoral drug administration to tumor MPS or oral drugs to apical gut MPS, etc.). Generally, channels do not impact PD response evaluation.

The microfluidic plate 101 includes one or more inlets 165a, 165b. In the illustrated implementation, the microfluidic plate 101 includes a first inlet 165a configured to receive a fluidic sample (such as a drug sample) and allow the fluidic sample to begin flowing through the platform 100 at a location of the first channel 160a. Insertion of the fluidic sample through the first inlet 165a can replicate intravenous (IV) dosing of a drug. The microfluidic plate 101 also includes a second inlet 165b configured to receive a fluidic sample and allow the fluidic sample to begin flowing through the platform 100 at the gut MPS 110. Insertion of the fluidic sample through the second inlet 165b can replicate oral dosing of a drug. Although the first inlet 165a is illustrated as being between the disease MPS 150 and the gut MPS 110, and the second inlet 165b is illustrated as being located on the gut MPS 110, other implementations are not so limited. In some implementations, the first inlet 165a is located between the liver MPS 120 and the adipose MPS 130. Such implementations can facilitate distinguishing between on-chip PK profiles of different types of drugs (for example, fast clearing and slow clearing drugs, fast permeable and slow permeable drugs, and so forth).

In constructing the platform 100, each of the plurality of channels 160a-160d and the plurality of MPSs 110-150 can be designed relative to each other to maximize some desired function (for example, performing PK analysis). In some implementations, each of the plurality of channels 160a-160d and the plurality of MPSs 110-150 are designed according to one or more design parameters (for example, media volume, number of cells by type, surface area, system level flow rate, flow pattern, flow partitioning, and so forth) to maximize the platform's 100 ability to approximate PK profiles and evaluate PD responses in humans. Determining the one or more design parameters to maximize a desired functions is discussed later in this specification.

Generally, the multi-MPS platform 100 includes a single block microfluidic device. Generally, the multi-MPS platform 100 is not be directly open to air, but if needed, a pump membrane is laminated on the MPSs. There is generally not a stacking up of the plates and membrane even though it may be that the multi-MPS platform 100 drives the MPSs pneumatic, diaphragm etc. pumps.

Figure 2:
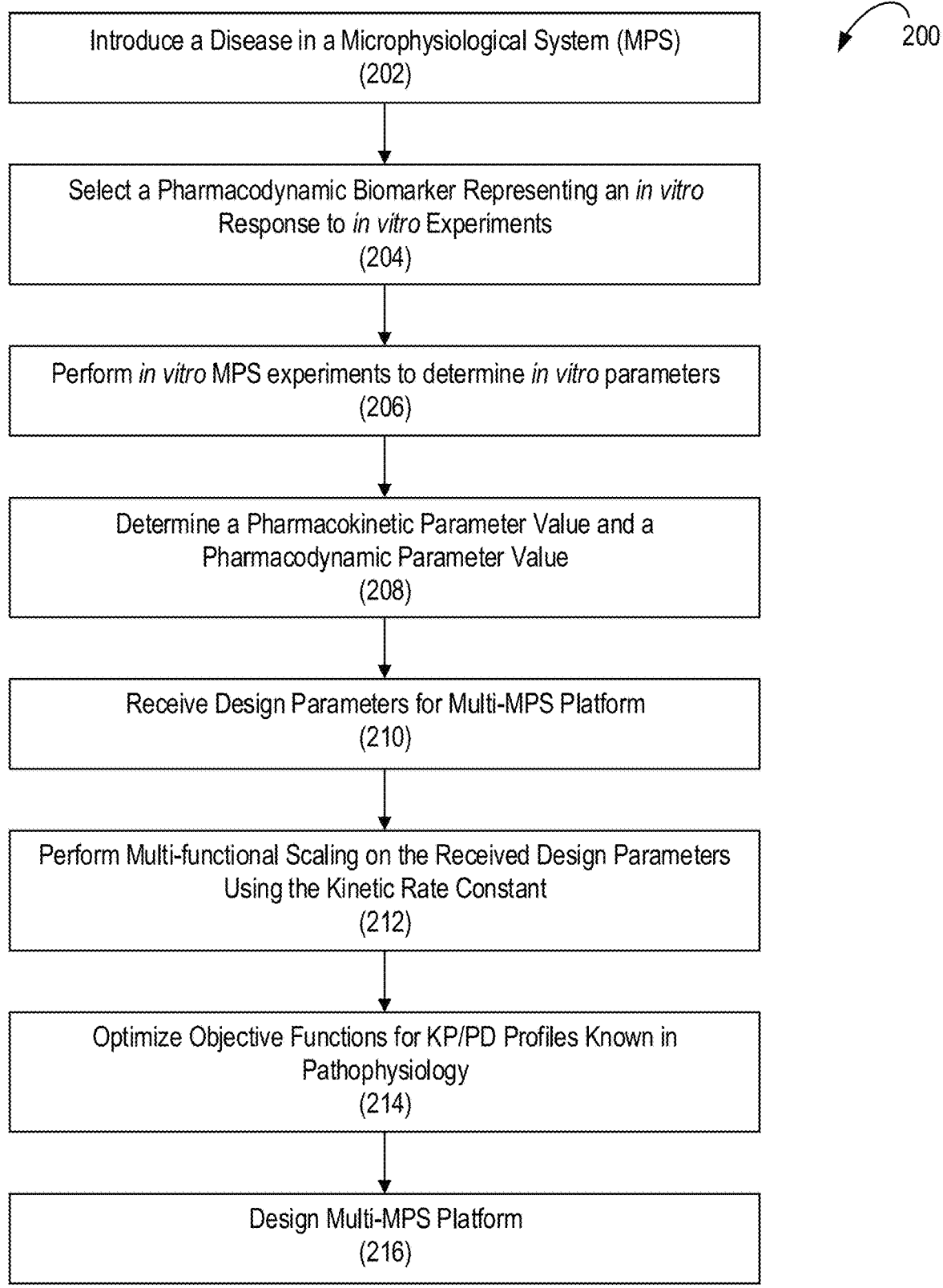
FIG. 2 is a flow chart illustrating an example method of designing a multi-MPS platform.

MPSs 110-140 for determining PK parameters simultaneously with PD response for the multi-MPS platform 100 can include many different designs. For example, a first design includes a hepatocytes culture (for example, monoculture or co-culture) on a flat surface. A second design includes hepatocytes and stromal co-culture with a physical membrane (which can be porous or non-porous) separating the hepatocytes from the stroma. A third design includes hepatocytes and stromal co-culture with micro-patterning of small "islands" for hepatocyte adhesion. Example co-culture cell types include hepatocytes, fibroblasts, Kupffer, liver, LSECs, and hepatic stellate cells. Several MPS configuration of each design (for example, in terms of cell types, ratio between cell types, and configuration of micropatterns) are experimentally tested and the maximum functionality is determined with respect to PK functionality (for example, the liver MPS having the design/configuration combination resulting in the highest clearance). As used in this specification, a design/configuration combination may be referred to as a pre-design parameter. In some implementations, the design parameters resulting in the maximum PK functionality is chosen for use. Examples of PK functionalities that can be used are absorption (for example, for gut MPSs), volume of distribution (for example, for Adipose/skin/muscle MPSs), hepatic clearance (for example, for liver MPS), and excretion (for example, for kidney MPSs). In some implementations, connecting a disease MPS 150 to PK MPSs 110-140 affects functions of the other MPSs 110-140. This may impact multi-MPS design criteria, and this impact is analyzed during multi-functional scaling. FIG. 2 is a flow chart illustrating an example process 200 of designing a multi-MPS platform. In some implementations, the process 200 is used to design the MPS platform 100 described previously with reference to FIG. 1. As previously described, a multi-MPS platform is chosen including a plurality of MPSs. The multi-MPS platform includes at least one disease MPS. The plurality of MPSs are designed in this process. Each of the MPSs correspond to a particular organ (for example, liver, adipose, skin, muscle, gut, kidney, and so forth). A drug sample is caused to interact with each of the MPSs for a predetermined amount of time by, in some implementations, flowing the drug sample through the MPSs. Pre-design parameters can be determined to generate an initial design for each of the MPSs, including the disease MPS, based on the disease chosen for evaluating the PD response. The initial design for each MPS can be based on maximizing tissue functionality (for example, in terms of viability and PK-related functions and maximizing a PD response in the disease MPS).

FIG. 2 is a flow chart illustrating an example process 200 of designing a multi-MPS platform. In some implementations, the process 200 is used to design the MPS platform 100 described previously with reference to FIG. 1. As previously described, a multi-MPS platform is chosen including a plurality of MPSs. The multi-MPS platform includes at least one disease MPS. The plurality of MPSs are designed in this process. Each of the MPSs correspond to a particular organ (for example, liver, adipose, skin, muscle, gut, kidney, and so forth). A drug sample is caused to interact with each of the MPSs for a predetermined amount of time by, in some implementations, flowing the drug sample through the MPSs. Pre-design parameters can be determined to generate an initial design for each of the MPSs, including the disease MPS, based on the disease chosen for evaluating the PD response. The initial design for each MPS can be based on maximizing tissue functionality (for example, in terms of viability and PK-related functions and maximizing a PD response in the disease MPS).

The process 200 includes introducing (202) a disease in an MPS, such as the disease MPS 150 of FIG. 1. Once a disease to be modeled is included in the multi-MPS platform 100, the process 200 includes selecting (204) a PD biomarker representing an in vitro response to in vitro experiments. The PD biomarker represents the PD response of the diseased tissue when a compound (such as a drug) is introduced to the MPSs of the multi-MPS platform 100. In some implementations, one or more biometric sensors are included in the disease MPS 150, as previously described, to monitor the chosen PD biomarker for the selected disease and selected tissue.

Generally, two types of biomarkers are used. For a PD MPS biomarker, a disease MPS 150 secretes the markers without drug intervention, similar to diagnostic biomarkers. For a PD biomarker, a response to a drug is measured. While PK/PD has been discussed primarily with respect to PD response biomarkers, these techniques and systems also apply to PD diagnostic biomarkers. Generally, PD MPS biomarkers can include pancreas insulin secretion, adipose tissue adipokine secretions, liver tissue hepatokine secretion, immune cells cytokine secretion, and so forth.

During the multi-MPS 100 design, PD MPS biomarkers can be used in multi-functional scaling algorithms to estimate disease tissue size for a desired PD MPS biomarkers concentration the system. For example, in NASH, adipokines (e.g., adiponectin) are secreted by adipose tissue and affects liver tissue. Adipose tissue size can be determined based on human plasma adipokine concentrations from NASH patients.

In an example, after the initial design of each MPS is chosen, and the disease and disease MPS 150 and PD biomarker are configured, one or more samples are collected of each of the MPSs throughout the predetermined amount of time, and a drug concentration profile is determined for each of the samples. Generally, both PD biomarkers (response) and PD MPS biomarkers (diagnostic) can be used together. Generally, for PD MPS biomarker experiments, drugs are not needed, but functionality is evaluated with biomarkers. The process 200 includes performing (204) in vitro MPS experiments to determine in vitro parameters for the multi-MPS platform 100. The in vitro experiments can include applying a compound (e.g., a drug) to the MPSs of the multi-MPS platform 100. In some implementations, concentration profiles are obtained from each of the MPSs 110-140 for the compound, and a PD response is monitored in the disease MPS 150. The in vitro parameters can represent the concentration profiles of the MPSs of the multi-MPS platform 100 and/or a response of the monitored PD biomarker. The in vitro parameters can be used to determine (206) PK parameter values and/or PD parameter values of the multi-MPS platform 100. Generally, at least one PK parameter is determined based on the concentration profiles. In some implementations, the at least one PK parameter includes at least one PK parameter for each organ type represented by the plurality of MPSs. That is, PK coefficients can be determined independent of the MPS specification (for example, clearance per cell). To determine the PK parameters, first-order differential equations can be used, as subsequently described in relation to FIG. 7.

Similarly, at least one PD response and/or diagnostic parameter is determined based on the PD biomarker. In some implementations, the at least one PD parameter includes at least one PD parameter for each PD biomarker represented by the disease MPS 150. The PD response can be determined independent of the MPS specification. To determine the PK parameters, an autonomous differential equation can be used, as subsequently described in relation to FIG. 6.

The process 200 includes receiving (208) design parameters for the multi-MPS platform 100. The design parameters include, for example, the physical geometry of the multi-MPS platform 100, the positions of the MPSs with respect to one another in the multi-MPS platform 100, particular concentrations of compounds used in the in vitro experiments to drive the PD response. Generally, both the determined PK parameters and PD response are used to determine design parameters for the MPS platform. In some implementations, the design parameters include media volume for at least one MPS, surface area for at least one MPS, number of cells for each MPS, media volume for at least one channel, a system level flow rate, a flow pattern, and/or a partitioning of flow. In some implementations, to determine the design parameters, a connectivity diagram is used to derive ordinary differential equations, which can be used, along with the determined PK parameters and PD response, and known in-human drug kinetic profiles, to optimize the design parameters such that the resulting MPS platform can approximate the known "in human" drug kinetic profiles and also in human disease biomarker profiles.

The process 200 includes performing (210) multi-functional scaling on the design parameters using the PK/PD parameter values. The process 200 includes optimizing (214) objective functions for PK/PD profiles known in pathophysiology. The process 200 includes designing (216) a multi-MPS platform based on the objective functions.

The design parameters are combined with the design parameters for each MPS to construct the MPS platform. Once constructed, the MPS platform can be validated by comparing predictions to experimental results using the multi-MPS platform. If the results are within a threshold, the MPS can be validated for use. If the results are not within the threshold, the design parameters can be changed, and the process can be repeated as necessary.

Figure 3:
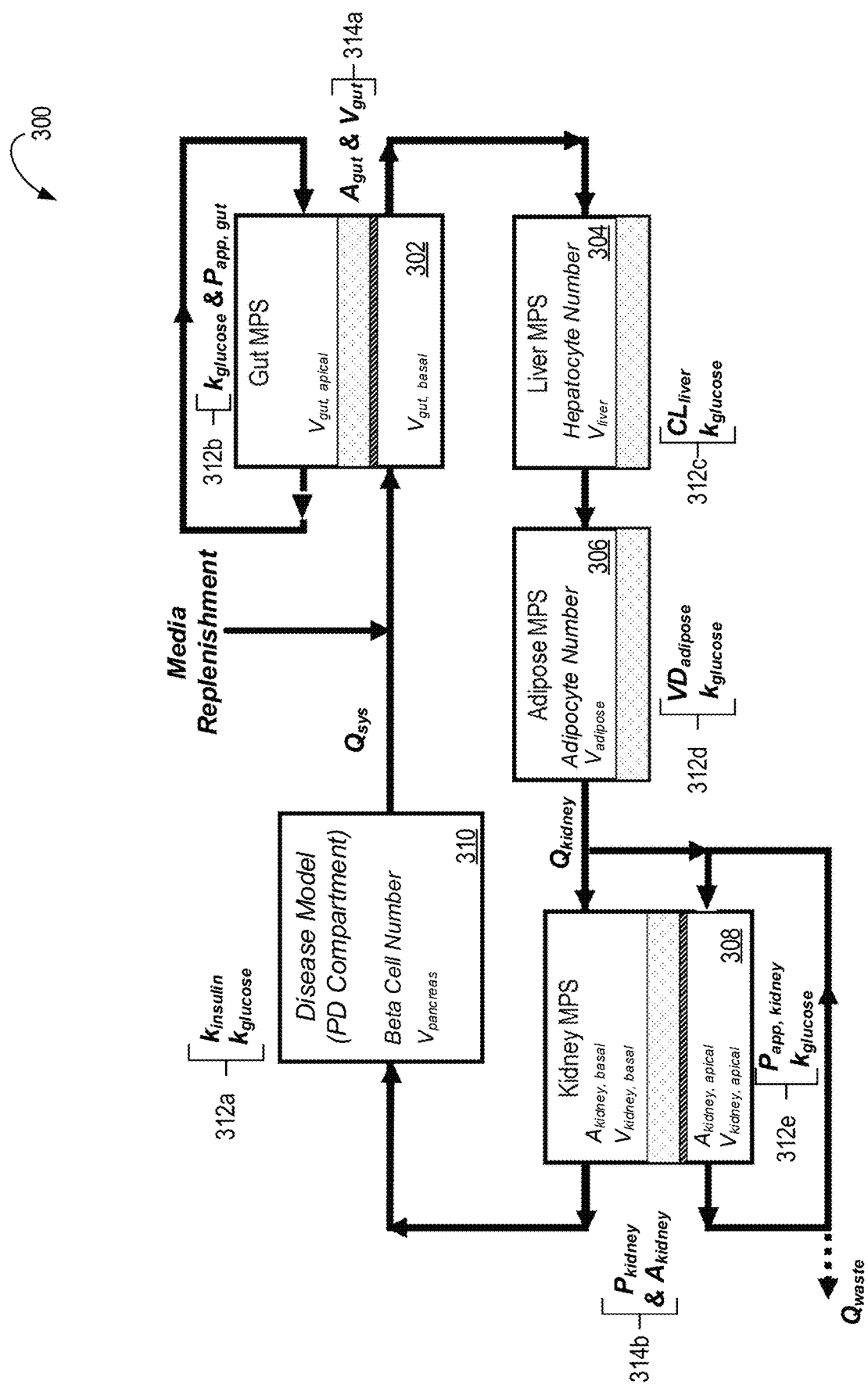
FIG. 3 shows a diagram illustrating an example multi-MPS platform for determining PD and PK parameters of the MPSs.
Figure 4:
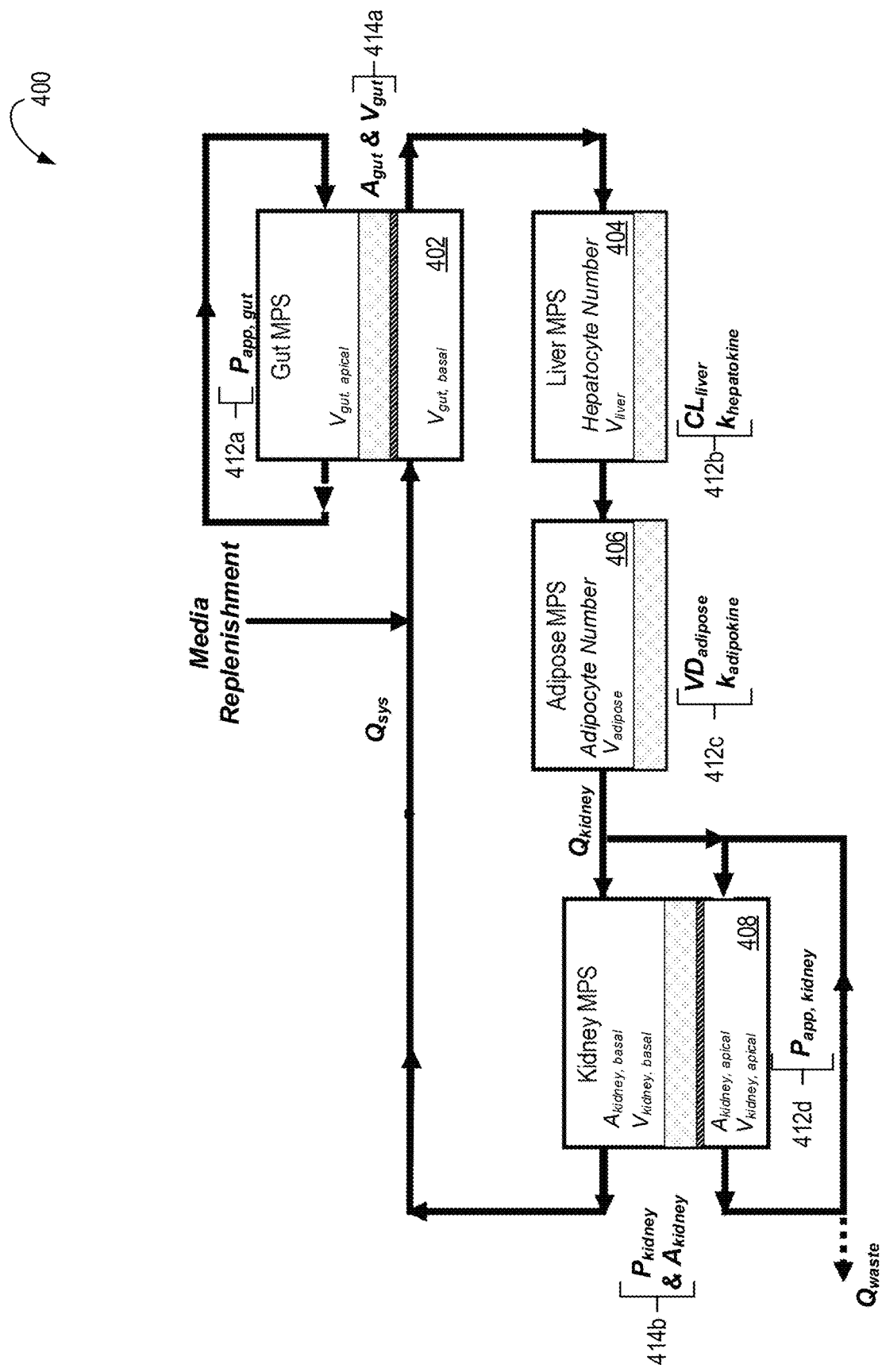
FIG. 4 is a diagram illustrating an example of determining a concentration profile.

FIGS. 3-4 show examples of multi-MPS platforms 300, 400 for testing PD responses and determining PK/PD parameters for different diseases. Turning to FIG. 3, the multi-MPS platform 300 includes a gut MPS 302, a liver MPS 304, an adipose MPS 306, a kidney MPS 308, and a disease model compartment 310. Here, the disease MPS 310 represents type II diabetes in a pancreas. The multi-MPS platform 300 is configured to determine PD parameters 312a including an insulin absorption constant $k_{insulin}$ and a glucose absorption constant $k_{glucose}$ at the disease model, PK parameters 312b including $k_{glucose}$ and an apical gut parameter $P_{app,gut}$ for the gut MPS 302, PK parameters 312c including a liver clearance parameter $CL_{liver}$ and $k_{glucose}$ at the liver MPS 304, PK parameters 312d volume of distribution for adipose $Vd_{adipose}$ and $k_{glucose}$ at the adipose MPS 306, and PK parameters 312e apical kidney parameter $P_{app, kidney}$ and $k_{glucose}$ at the kidney MPS 308. These PK parameters are input function kinetic rate constants that are determined by in vitro experiments as previously described. The PK parameters are supplied to ODE algorithms along with the design parameters. The ODE algorithms are used by the computing system to perform the multi-functional scaling as described in relation to FIG. 2.

For the multi-MPS platform 300, a use case including a disease of type II diabetes in the PD MPS 310 is shown. Here, a pathophysiological hallmark includes an increased dietary glucose uptake which leads to pancreatic beta cell dysfunction. The pancreatic beta cell dysfunction in turn causes increased glucose in systemic circulation (e.g., hyperglycemia). Thus, the parameters of glucose and insulin are measured throughout the multi-MPS platform 300. The disease MPS 310 represents a pancreas.

Generally, input functions are obtained from individual MPS experiments. For example, a first input function includes drug pharmacokinetic parameters from each MPS 302, 304, 306, 308, 310. These include a gut parameter $P_{gut}$, $P_{kidney}$, $CL_{liver}$, and $Vd_{adipose}$, and are subsequently described further. A second input function includes glucose consumption rates from each healthy MPS 302, 304, 306, 308 and disease MPS 310, including $k_{glucose}$. A third input function includes A third input function is a PD MPS biomarker which can include markers as previously described, such as insulin secretion rates in diseased pancreas MPS, including $k_{insulin}$, glucose stimulated insulin secretion rates in a disease pancreas MPS, including kGSIS, and so forth.

Generally, the optimized parameters for the MPSs 302-310 of the multi-MPS platform 300 include a gut surface area, a liver hepatocyte cell number, an adipose cell number, a kidney surface area, a pancreatic beta-cell cell number, compartment volumes, and flow rates. Objective functions can include PK profiles in a human. A second objective function can include a predetermined glucose profile in the systemic circulation loop. A third objective function can include a predetermined insulin profile in the systemic circulation loop. The predetermined glucose profile can represent human plasma insulin concentrations obtained during fasting, eating and resting states. Generally, glucose profiles can be the peak concentration, time-concentration profile, or AUC of glucose in plasma, and so forth. Generally, a predetermined insulin profile can be human plasma insulin values obtained during fasting, eating and resting states. The insulin profiles can be the peak concentration, time-concentration profile or AUC of insulin in plasma, and so forth.

Generally, for disease induction in the multi-MPS platform 300, the designed multi-MPS can be cultured such that a desired marker is observed. For example, the designed multi-MPS can be cultured in high glucose containing tissue culture media until glucose-dependent beta-cell dysfunction is observed. This time can be predetermined or experimentally determined, and can be based on the design parameters of the multi-MPS platform 300. Other approaches include using high insulin, high glucose, and high free fatty acid media to introduce metabolic syndrome in liver, adipose, pancreas, and skeletal muscle MPSs. Alternatively, beta cells from diabetic patients can be used, which inherit the disease phenotype.

The multi-MPS platform 300 is configured allow a determination of several optimized design parameters based on the in vitro experiments. These are called objective parameters and are determined as a result of the multi-functional scaling operations, scaled from the multi-MPS platform 300 to represent a human system. The optimized design parameters include a Beta Cell Number for the disease and a pancreas parameter $V_{pancreas}$ value represented by the disease MPS 310. The objective parameters include apical gut parameter $V_{gut, apical}$ and basal gut parameter $V_{gut, basal}$ values represented by the gut MPS 302. The objective parameters include a hepatocyte number and a liver parameter $V_{liver}$ value for the liver MPS 304. The objective parameters include an adipocyte number and an adipose parameter $V_{adipose}$ value for the adipose MPS 306. The objective parameters include an a basal kidney parameter $A_{kidney, basal}$, a basal kidney parameter $V_{kidney, basal}$, an apical kidney parameter $A_{kidney, apical}$, and an apical kidney parameter $V_{kidney, apical}$ values for the kidney MPS 308.

FIG. 4 shows an example multi-MPS platform 400 for a second use case. The multi-MPS platform 400 includes a gut MPS 402, a liver MPS 404, an adipose MPS 406, a kidney MPS 408, and a disease model compartment is not needed. In this example 400, diseased tissue can be within PK relevant MPSs 402, 404, 406, and 408 rather than in a separate, stand-alone disease MPs. Here, liver and adipose MPSs are the disease MPS in NASH. Both are metabolically dysfunctional, and adipokines and hepatokines are used to assess the dysfunction and scaled to be at the human concentrations. Here, the disease represents fatty liver disease in a liver. The multi-MPS platform 400 is configured for determining PD parameters at the disease model, PK parameters 412a including $P_{app,gut}$ for the gut MPS 402, PK parameters 412b including $CL_{liver}$ and a constant $k_{hepatokine}$ at the liver MPS 404, PK parameters 412d including an adipose volume of distribution $VD_{adipose}$ and constant $k_{adipokine}$ at the adipose MPS 406, and PK parameters 412d including an apical kidney parameter $P_{app, kidney}$ at the kidney MPS 408. These PK parameters are input function kinetic rate constants that are determined by in vitro experiments as previously described. Additionally, PD parameters including constant $k_{hepatokine}$ and constant $k_{adipokine}$ feed into the multi-functional model along with PK parameters The PK parameters are supplied to ODE algorithms along with the design parameters. The ODE algorithms are used by the computing system to perform the multi-functional scaling as described in relation to FIG. 2.

Generally, input functions are obtained from individual MPS experiments for the multi-MPS platform 400. A first input function includes drug pharmacokinetic parameters from each MPS 402-408, including gut parameter $P_{gut}$, kidney parameter $P_{kidney}$, clearance parameter $CL_{liver}$, and volume of distribution $Vd_{adipose}$.

The multi-MPS platform 400 is configured allow a determination of several optimized design parameters based on the in vitro experiments. These are called objective parameters and are determined as a result of the multi-functional scaling operations, scaled from the multi-MPS platform 300 to represent a human system. The optimized design parameters include gut surface area, liver hepatocyte cell number, adipose cell number, kidney surface area, compartment volumes, and flow rates in the channels of the multi-MPS platform 400. The objective function for the multi-MPS platform 400 provides for PK/PD profiles in a human.

Other use cases are possible. In a third use case, a disease affecting multiple MPSs of a multi-MPS platform (similar to platforms 100, 300, 400, etc.) can be modeled. For example, a nonalcoholic fatty liver disease or non-alcoholic steatohepatitis can be modeled in a multi-MPS platform. A pathophysiological hallmark of the disease is insulin resistance in the liver caused by increased dietary glucose uptake. Metabolic syndrome is observed in adipose and liver MPS when stimulated with high glucose, high insulin and high fat media.

Here, a pathophysiological hallmark includes increased dietary glucose and fat and free fatty acid consumption results in insulin resistant phenotypes in liver and adipose tissues. These diseased phenotypes have crosstalk via secreted, circulating biomolecules called hepatokines from liver and adipokines from adipose tissue. In this use case, a multi-MPS platform 100 including gut, liver, adipose, and kidney MPSs can be constructed, similar to multi-MPS platforms 100, 300, and 400.

To obtain the PD response and PK parameters related to the multi-MPS platform for modeling NASH, disease induction in individual MPSs can include a liver culture or adipose MPSs with tissue culture media with high glucose and free fatty acid concentrations. The input functions can include drug pharmacokinetic parameters from each MPS, including gut parameter $P_{gut}$, kidney parameter $P_{kidney}$, clearance parameter $CL_{liver}$, and volume of distribution $Vd_{adipose}$. A second input function can include adipokine secretion rates in "diseased" adipose MPS, called a $k_{adipokine}$ parameter. A third input function can include hepatokine secretion rates in "diseased" liver MPS, the parameter called khepatokine.

Generally, the optimized parameters for this example include a gut surface area, a liver hepatocyte cell number, an adipose cell number, a kidney surface area, and a pancreatic beta-cell cell number. The objective functions for this multi-MPS platform include drug profiles in for the multi-MPS platform, predetermined adipokine concentrations in the systemic circulation loop, and predetermined hepatokines (e.g., FGF21, fetuin A) concentration in the systemic circulation loop. Generally, predetermined concentrations may be based on known concentrations observed in human or may be determined based on the effective concentrations, (e.g., FGF21 binds and activates to FGF receptors). The receptor activating concentrations can be obtained from known receptor-ligand dissociation constants ($K_d$) or it can be experimentally determined by stimulating the adipose tissue with various doses of FGF21 and monitoring FGF receptor activation.

While several use cases have been enumerated in relation to FIGS. 3-4, these are merely illustrative and non-exhaustive. There are many additional disease models which can be tested on multi-MPS platforms that are designed to model them as previously described. In general, once the design criteria are established, a multi-MPS platform with the multi-functional scaling algorithms can be manufactured. In some implementations, pathophysiology-specific platforms will house multiple MPSs related to PK and pathophysiology functions. The pathophysiology on the multi-MPS platform (e.g., platform 100) can be induced in various ways. For example, the pathophysiology can be introduced using diseased cells, such as neurons with Parkinson's related genetic mutations. In another example, the pathophysiology can be induced on the platform by treating healthy MPS with exogenous molecules, such as neurotoxin-induced Parkinson's disease or such as free fatty acid induced fatty liver disease. In another example, a disease can be induced by using inter-tissue crosstalk, such as NAFLD/NASH induction by the adipokine-hepatokine crosstalk between adipose and liver tissues. Generally, once the disease is induced, the multi-MPS platform is ready for drug experiments. Samples from the platform can be used to determine drug concentrations on the platform and PK parameters for the MPSs on the platform. Additionally, samples can be used to determine PD parameters/responses on the multi-MPS platform.

For the multi-MPS platform 100, drugs can be added to the apical gut (oral) and/or the systemic circulation loop (IV). The added drug(s) will have human relevant PK profiles on the platform (default by the design described previously). Generally, samples are collected from the multi-MPS platform 100 (e.g. from circulation loop) at discreet time points (e.g., 4 hr, 24 hr etc.). Generally, drug concentrations in the samples will be quantified by mass spectrometry. For parameterizing the PK properties, computational models (e.g. first order decay equation or QSP mechanistic modeling) can be used, as subsequently described in relation to FIG. 7. Generally, PK parameters obtained from on chip drug concentrations profiles are renal and hepatic clearance, absorption, volume of distribution.

For the multi-MPS platform 100, pharmacodynamic biomarkers (e.g., response biomarkers) can be used to evaluate PD response of various diseases, as previously described. For example, PD biomarkers can include secreted extracellular biomarkers, such as a glucose concentration in the mixing chamber for diabetes. The PD biomarkers can include intracellular biomarkers, such as fat accumulation and fibrosis in a liver MPS for NAFLD & NASH. The PD biomarkers can include tissue characteristics, such as a change in tumor size in tumor MPS for cancer. Generally, a dose-response curve of the PD biomarker of interest will be generated on our platform to show the PD response. Mathematical equations are used to parameterize experimentally obtained dose-response relationships, as described in relation to FIG. 6.

Figure 5:
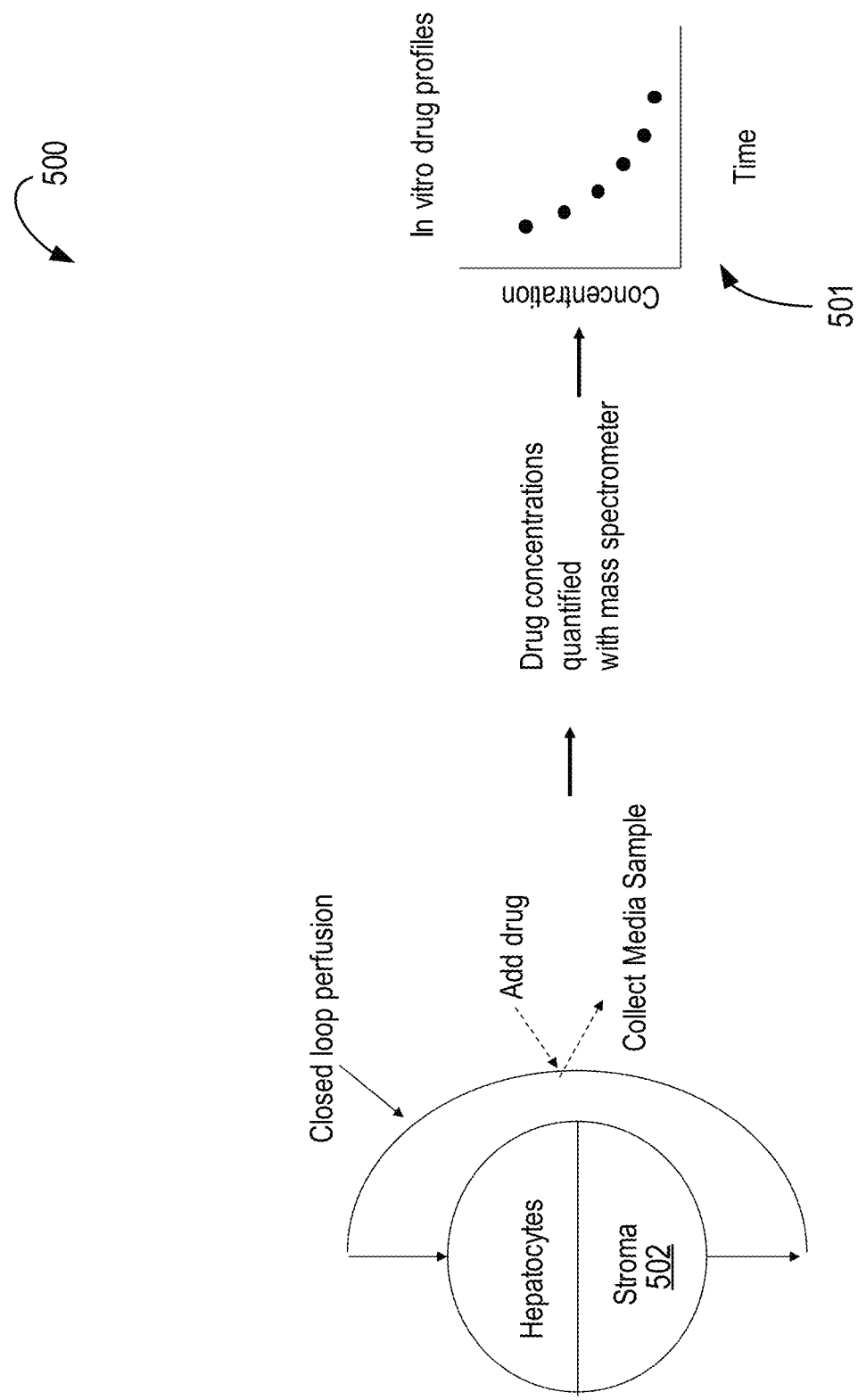
FIG. 5 is a diagram illustrating an example of determining PK parameters

FIG. 5 is a diagram illustrating an example 500 of determining a concentration profile 501. In the illustrated implementation, using a closed loop perfusion technique, a drug sample is caused to interact with a liver MPS 502 that was constructed with design parameters similar to the Design 2 that was discussed previously with reference to FIG. 3. Samples of the MPS 502 are collected at several time points throughout the predetermined amount of time, and, for each time point, the concentration of the drug is quantified in the sample using mass spectrometry. Based on the quantified concentration of the drug, a concentration profile 501 of the drug is generated. This approach be applied to multi-MPS platforms 100, 300, 400.

Figure 6:
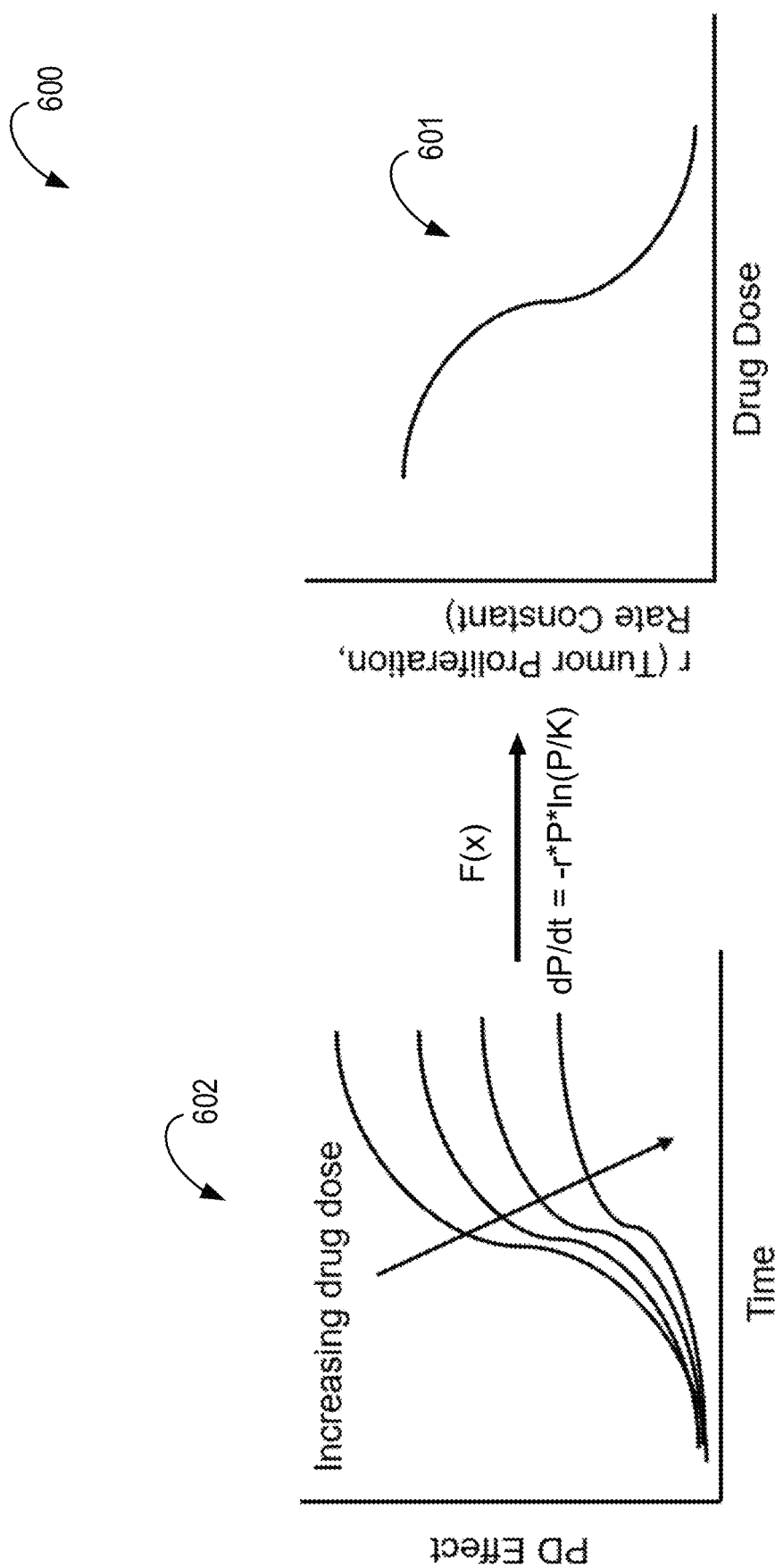
FIG. 6 is a diagram illustrating an example model for determining PD parameters.

FIG. 6 shows a diagram illustrating an example 600 for determining PD responses by parameterizing experimentally obtained dose-response relationships. Generally, PD parameters are used to evaluate disease modifying response of drugs. The dose-response relationships (e.g., graph 601) are experimentally evaluated on the multi-MPS platform 100 and parameterized. For example, an effect of chemotherapy on tumor growth may be assessed on the multi-MPS platform with various drug doses. The change in the tumor growth rate is computationally estimated, such as with a Gompertz equation.

In an example, the process 600 of FIG. 6 shows how to convert measured PD response in an MPS to a parameter value that is used in PBPK models to be scale an in vitro PD effect to an in vivo PD effect for humans. In some implementations, a pharmacodynamic effect of a drug on tumor MPS can be monitored by evaluation the tumor size. A tumor-hosting MPS that hosts cancerous tissue is treated with varying doses of a drug (e.g., a dose response). The PD effect is monitored over time, as shown in graph 602 (a PD effect vs time graph). Graph 602 shows that increasing dose of a drug (e.g. chemotherapy) reduces the tumor size (PD effect) over time. A computational algorithm F(x) (e.g. a Gompertz equation for tumor growth) is used by the computing system to parameterize tumor growth inhibition for each drug concentration. The example equation is $$\frac{dP}{dt} = -r * P * \ln\left(\frac{P}{K}\right),$$

which is described as a Gompertz equation. Here, r is a constant related to cell proliferation, K represents a carrying capacity of the tissue, and P is a measured tumor size. Generally, each drug dose has a different cell proliferation constant because of the tumor size reduction corresponding to the increasing dose. Graph 601 shows that there is an approximately inversely proportional relationship of drug dose to tumor size. Similar examples can be used for different PD effects.

Figure 7:
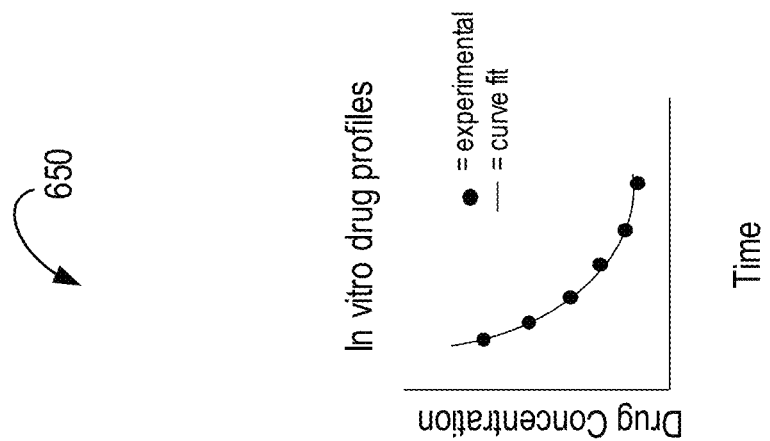
FIG. 7 is a flow chart illustrating an example method of parameterizing a concentration profile determined from an MPS platform.
Figure 7:
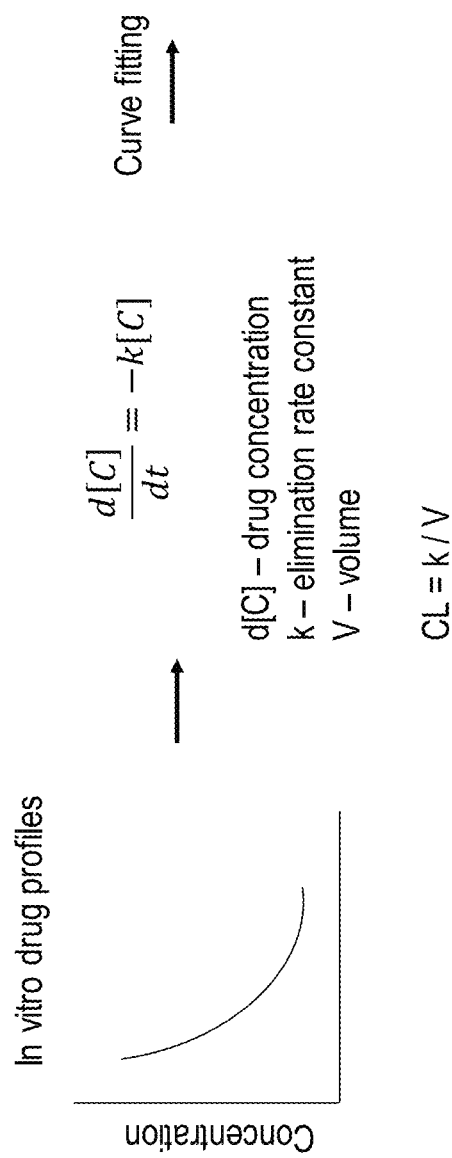

FIG. 7 is a flow chart illustrating an example process 650 of parameterizing a concentration profile determined from an MPS platform (e.g., multi-MPS platform 100). Experimental concentration profiles are obtained from the multi-MPS platform 100. The concentration profiles are analyzed with mechanistic (e.g., ODE-based) models by curve fitting of the model to actual in vitro experimental data (e.g., by computationally optimizing elimination rate constant (k)).

As shown, a first-order differential equation can defined as $$-\frac{d[C]}{dt} = k[C],$$

in which

[C] is the drug concentration and k is the elimination rate constant (sometimes referred to as kel in this specification). In some implementations, the first-order differential equation can be used to determine k, which can then be used to determine one or more PK parameters, such as clearance, which can be defined as CL=k/V, where V is the volume of the tested MPS sample. As a result, PK parameters per cell of the MPS can be estimated. For MPSs having basolateral and apical compartments, the following equations (1), (2) can be used:

$$\frac{d[C]_{apical}}{dt} = P * A([C]\text{basal} - [C]\_\text{apical}) \quad (1)$$

$$\frac{d[C]_{basal}}{dt} = P * A([C]_{apical} - [C]_{basal}) \quad (2)$$

Generally, equations (1) and (2) are solved simultaneously for multi-MPS platforms. Both PK and PD parameters obtained as shown in FIGS. 6-7 are used for in vitro in vivo translation. Methods of translating PK and PD parameters can be performed as described in application Ser. No. 16/834,235., titled "MICROFLUIDIC DEVICES AND METHODS OF DESIGNING AND USING MICROFLUIDIC DEVICES," filed on Mar. 30, 2020, which is incorporated by referenced in entirety herein.

Figure 8:
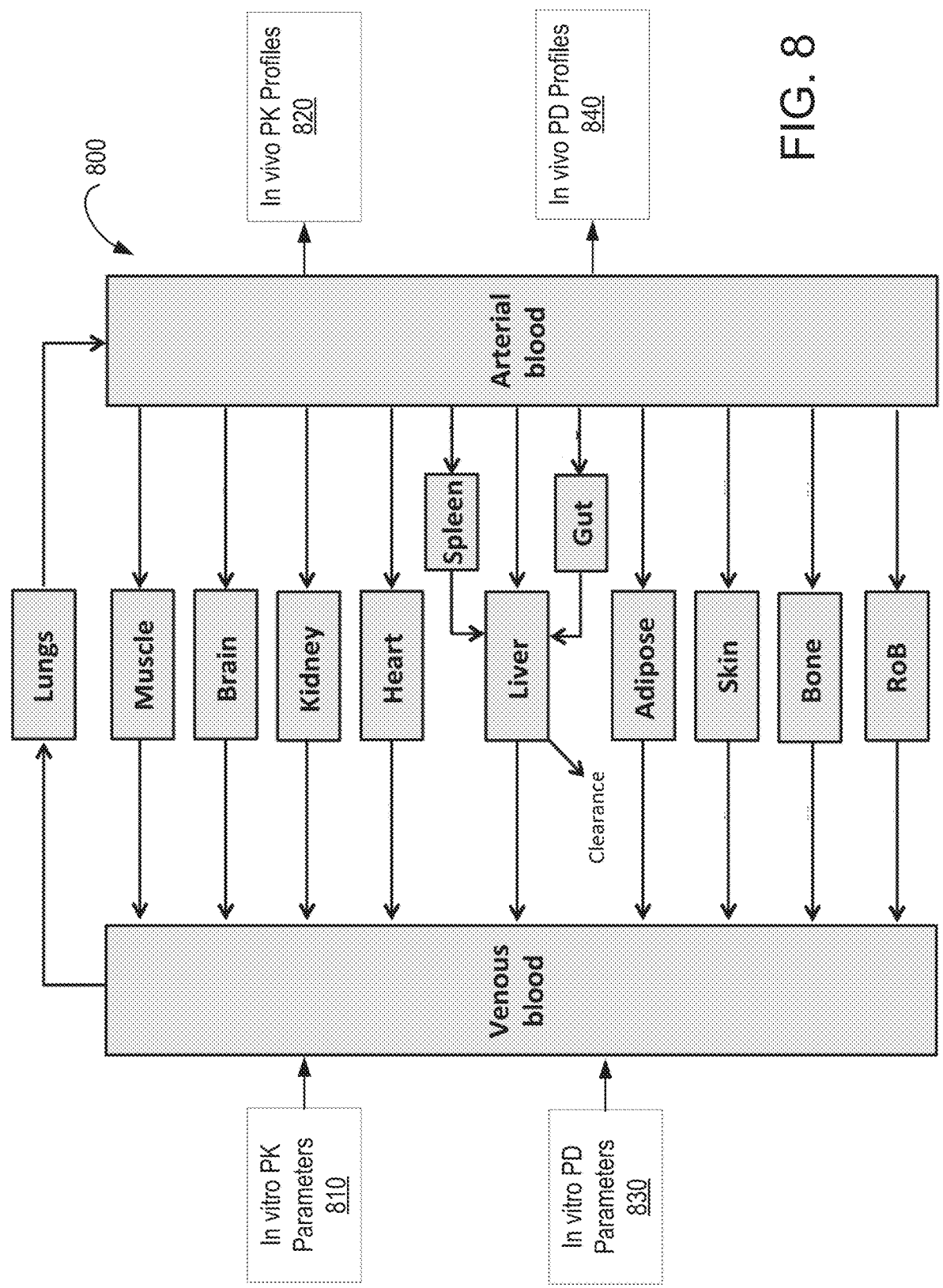
FIG. 8 is a flow chart illustrating an example model for translating in vitro PK and PD parameters to in vivo PK and PD parameters. In an example, a PBPK/QSP diagram shows an example for mechanistic (ODE-based) modeling.

FIG. 8 is a flow chart illustrating an example model 800 for translating in vitro PK parameters to in vivo PK parameters. The human physiologically based pharmacokinetic (PBPK) model 800 illustrated in FIG. 8, which can be based on conservation of mass principles, can be used to translate in vitro PK results 810 and in vitro PD results 830 to human in vivo profiles 820, 840, respectively. In the illustrated implementation, the PK parameters 810 obtained from the in vitro MPSs (for example, liver MPS, kidney MPS, adipose MPS, gut MPS, and so forth) can be used as input parameters 810 in corresponding components of the human PBPK model 800. That is, intrinsic clearance values, for example, can be obtained from a liver MPS of the MPS platform and used as input parameters for the liver component of the PBPK model 800. A similar process is applied for PD parameters 830. The parameters 810, 830 can be adjusted based on the differences between in vitro and in vivo physiology (such as cell numbers and enzymatic activity differences), and drug specific parameters (such as physiochemical properties). For physiological differences, the parameters can be directly scaled. For example, scaling can be based on the number of liver cells of the liver MPS and number of liver cells in the human liver. For drug specific parameters, empirical scaling factors (ESFs) can be used. ESF parameters for new molecular entities can be estimated using machine learning algorithms, as described later. The scaled in vitro parameters can then be used in the PBPK model 800 to translate the in vitro MPS results to in vivo human PK profiles 820 and PD profiles 840. This approach can be applied for several PK parameters and PD parameters, such as permeability parameters in gut and kidney, hepatic clearance in liver, volume of distribution in adipose, and so on.

Figure 9:
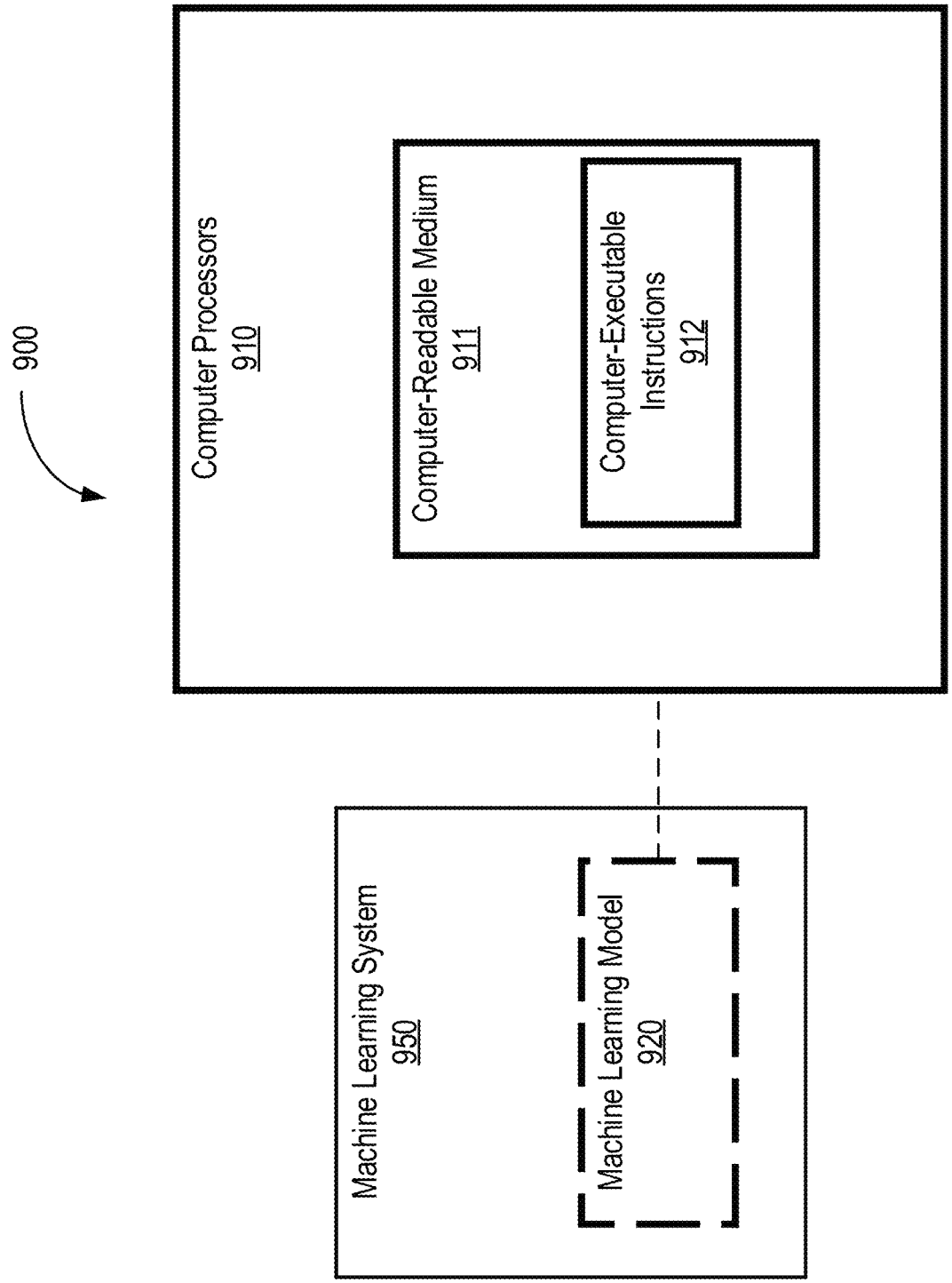
FIG. 9 is a diagram illustrating an example computer system configured to execute a machine learning model.

FIG. 9 is a diagram illustrating an example computer system 900 configured to execute a machine learning model. Generally, the computer system 900 is configured to process data indicating a molecular structure and determine an ESF for scaling in vitro PK parameters to in vivo PK parameters. The system 900 includes computer processors 910. The computer processors 910 include computer-readable memory 911 and computer readable instructions 912. The system 900 also includes a machine learning system 950. The machine learning system 950 includes a machine learning model 920. The machine learning model 920 can be separate from or integrated with the computer processors 910.

The computer-readable medium 911 (or computer-readable memory) can include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. In an embodiment, the computer-readable medium 911 includes code-segment having executable instructions.

In some implementations, the computer processors 910 include a general purpose processor. In some implementations, the computer processors 910 include a central processing unit (CPU). In some implementations, the computer processors 910 include at least one application specific integrated circuit (ASIC). The computer processors 910 can also include general purpose programmable microprocessors, graphic processing units, special-purpose programmable microprocessors, digital signal processors (DSPs), programmable logic arrays (PLAs), field programmable gate arrays (FPGA), special purpose electronic circuits, etc., or a combination thereof. The computer processors 910 are configured to execute program code means such as the computer-executable instructions 912 and configured to execute executable logic that includes the machine learning model 920.

The computer processors 910 are configured to receive data indicating a molecular structure of, for example, a drug. The data can be obtained through one or more means, such as wireless communications with databases, optical fiber communications, USB, CD-ROM, and so forth.

The machine learning model 920 is capable of processing the data to determine an ESF. In some implementations, the machine learning model 920 is trained to determine ESF using a data set that includes molecular properties (for example, chemical structure and/or physiochemical properties) of several drugs, the in vitro PK parameters of the drugs determined using an MPS platform, and known human in vivo PK parameters of the drugs. The machine learning model 920 can determine a scaling factor between the in vivo PK parameters and the in vitro PK parameters for each drug, and associate the scaling factor with the molecular properties of the drug. Accordingly, when a new drug is introduced to the machine learning model 920, it can determine a scaling factor for the in vitro PK properties of the drug that were obtained using the MPS platform based on the molecular properties of the drug.

The machine learning system 950 is capable of applying machine learning techniques to train the machine learning model 920. As part of the training of the machine learning model 920, the machine learning system 950 forms a training set of input data by identifying a positive training set of input data items that have been determined to have the property in question, and, in some embodiments, forms a negative training set of input data items that lack the property in question.

The machine learning system 950 extracts feature values from the input data of the training set, the features being variables deemed potentially relevant to whether or not the input data items have the associated property or properties. An ordered list of the features for the input data is herein referred to as the feature vector for the input data. In one embodiment, the machine learning system 950 applies dimensionality reduction (e.g., via linear discriminant analysis (LDA), principle component analysis (PCA), or the like) to reduce the amount of data in the feature vectors for the input data to a smaller, more representative set of data.

In some implementations, the machine learning system 950 uses supervised machine learning to train the machine learning models 920 with the feature vectors of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The machine learning model 920, when applied to the feature vector extracted from the input data item, outputs an indication of whether the input data item has the property in question, such as a Boolean yes/no estimate, or a scalar value representing a probability.

In some embodiments, a validation set is formed of additional input data, other than those in the training sets, which have already been determined to have or to lack the property in question. The machine learning system 950 applies the trained machine learning model 920 to the data of the validation set to quantify the accuracy of the machine learning model 920. Common metrics applied in accuracy measurement include: Precision=TP/(TP+FP) and Recall=TP/(TP+FN), where precision is how many the machine learning model correctly predicted (TP or true positives) out of the total it predicted (TP+FP or false positives), and recall is how many the machine learning model correctly predicted (TP) out of the total number of input data items that did have the property in question (TP+FN or false negatives). The F score (F-score=2*PR/(P+R)) unifies precision and recall into a single measure. In one embodiment, the machine learning module iteratively re-trains the machine learning model until the occurrence of a stopping condition, such as the accuracy measurement indication that the model is sufficiently accurate, or a number of training rounds having taken place.

In some implementations, the machine learning model 920 is a convolutional neural network (CNN). A CNN can be configured based on a presumption that inputs to the CNN correspond to image pixel data for an image or other data that includes features at multiple spatial locations. For example, sets of inputs can form a multi-dimensional data structure, such as a tensor, that represent color features of an example digital image (e.g., a biological image of biological tissue). In some implementations, inputs to the CNN correspond to a variety of other types of data, such as data obtained from different devices and sensors of a vehicle, point cloud data, audio data that includes certain features or raw audio at each of multiple time steps, or various types of one-dimensional or multiple dimensional data. A convolutional layer of the CNN can process the inputs to transform features of the image that are represented by inputs of the data structure. For example, the inputs are processed by performing dot product operations using input data along a given dimension of the data structure and a set of parameters for the convolutional layer.

Performing computations for a convolutional layer can include applying one or more sets of kernels to portions of inputs in the data structure. The manner in which CNN performs the computations can be based on specific properties for each layer of an example multi-layer neural network or deep neural network that supports deep neural net workloads. A deep neural network can include one or more convolutional towers (or layers) along with other computational layers. In particular, for example computer vision applications, these convolutional towers often account for a large proportion of the inference calculations that are performed. Convolutional layers of a CNN can have sets of artificial neurons that are arranged in three dimensions, a width dimension, a height dimension, and a depth dimension. The depth dimension corresponds to a third dimension of an input or activation volume and can represent respective color channels of an image. For example, input images can form an input volume of data (e.g., activations), and the volume has dimensions 32×32×3 (width, height, depth respectively). A depth dimension of 3 can correspond to the RGB color channels of red (R), green (G), and blue (B).

In general, layers of a CNN are configured to transform the three dimensional input volume (inputs) to a multi-dimensional output volume of neuron activations (activations). For example, a 3D input structure of 32×32×3 holds the raw pixel values of an example image, in this case an image of width 32, height 32, and with three color channels, R,G,B. A convolutional layer of a CNN of the machine learning model 920 computes the output of neurons that may be connected to local regions in the input volume. Each neuron in the convolutional layer can be connected only to a local region in the input volume spatially, but to the full depth (e.g., all color channels) of the input volume. For a set of neurons at the convolutional layer, the layer computes a dot product between the parameters (weights) for the neurons and a certain region in the input volume to which the neurons are connected. This computation may result in a volume such as 32×32×12, where 12 corresponds to a number of kernels that are used for the computation. A neuron's connection to inputs of a region can have a spatial extent along the depth axis that is equal to the depth of the input volume. The spatial extent corresponds to spatial dimensions (e.g., x and y dimensions) of a kernel.

A set of kernels can have spatial characteristics that include a width and a height and that extends through a depth of the input volume. Each set of kernels for the layer is applied to one or more sets of inputs provided to the layer. That is, for each kernel or set of kernels, the machine learning model 920 can overlay the kernel, which can be represented multi-dimensionally, over a first portion of layer inputs (e.g., that form an input volume or input tensor), which can be represented multi-dimensionally. For example, a set of kernels for a first layer of a CNN may have size 5×5×3×16, corresponding to a width of 5 pixels, a height of 5 pixel, a depth of 3 that corresponds to the color channels of the input volume to which to a kernel is being applied, and an output dimension of 16 that corresponds to a number of output channels. In this context, the set of kernels includes 16 kernels so that an output of the convolution has a depth dimension of 16.

The machine learning model 920 can then compute a dot product from the overlapped elements. For example, the machine learning model 920 can convolve (or slide) each kernel across the width and height of the input volume and compute dot products between the entries of the kernel and inputs for a position or region of the image. Each output value in a convolution output is the result of a dot product between a kernel and some set of inputs from an example input tensor. The dot product can result in a convolution output that corresponds to a single layer input, e.g., an activation element that has an upper-left position in the overlapped multi-dimensional space. As discussed above, a neuron of a convolutional layer can be connected to a region of the input volume that includes multiple inputs. The machine learning model 920 can convolve each kernel over each input of an input volume. The machine learning model 920 can perform this convolution operation by, for example, moving (or sliding) each kernel over each input in the region.

The machine learning model 920 can move each kernel over inputs of the region based on a stride value for a given convolutional layer. For example, when the stride is set to 1, then the machine learning model 920 can move the kernels over the region one pixel (or input) at a time. Likewise, when the stride is 2, then the machine learning model 920 can move the kernels over the region two pixels at a time. Thus, kernels may be shifted based on a stride value for a layer and the machine learning model 920 can repeatedly perform this process until inputs for the region have a corresponding dot product. Related to the stride value is a skip value. The skip value can identify one or more sets of inputs (2×2), in a region of the input volume, that are skipped when inputs are loaded for processing at a neural network layer. In some implementations, an input volume of pixels for an image can be "padded" with zeros, e.g., around a border region of an image. This zero-padding is used to control the spatial size of the output volumes.

As discussed previously, a convolutional layer of CNN is configured to transform a three dimensional input volume (inputs of the region) to a multi-dimensional output volume of neuron activations. For example, as the kernel is convolved over the width and height of the input volume, the machine learning model 920 can produce a multi-dimensional activation map that includes results of convolving the kernel at one or more spatial positions based on the stride value. In some cases, increasing the stride value produces smaller output volumes of activations spatially. In some implementations, an activation can be applied to outputs of the convolution before the outputs are sent to a subsequent layer of the CNN.

An example convolutional layer can have one or more control parameters for the layer that represent properties of the layer. For example, the control parameters can include a number of kernels, K, the spatial extent of the kernels, F, the stride (or skip), S, and the amount of zero padding, P. Numerical values for these parameters, the inputs to the layer, and the parameter values of the kernel for the layer shape the computations that occur at the layer and the size of the output volume for the layer. In some implementations, the spatial size of the output volume is computed as a function of the input volume size, W, using the formula (W−F+2P)/S+1. For example, an input tensor can represent a pixel input volume of size [227×227×3]. A convolutional layer of a CNN can have a spatial extent value of F=11, a stride value of S=4, and no zero-padding (P=0). Using the above formula and a layer kernel quantity of K=96, the machine learning model 920 performs computations for the layer that results in a convolutional layer output volume of size [55×55×96], where 55 is obtained from [(227−11+0)/4+1=55].

The computations (e.g., dot product computations) for a convolutional layer, or other layers, of a CNN involve performing mathematical operations, e.g., multiplication and addition, using a computation unit of a hardware circuit of the machine learning model 920. The design of a hardware circuit can cause a system to be limited in its ability to fully utilize computing cells of the circuit when performing computations for layers of a neural network.

Figure 10:
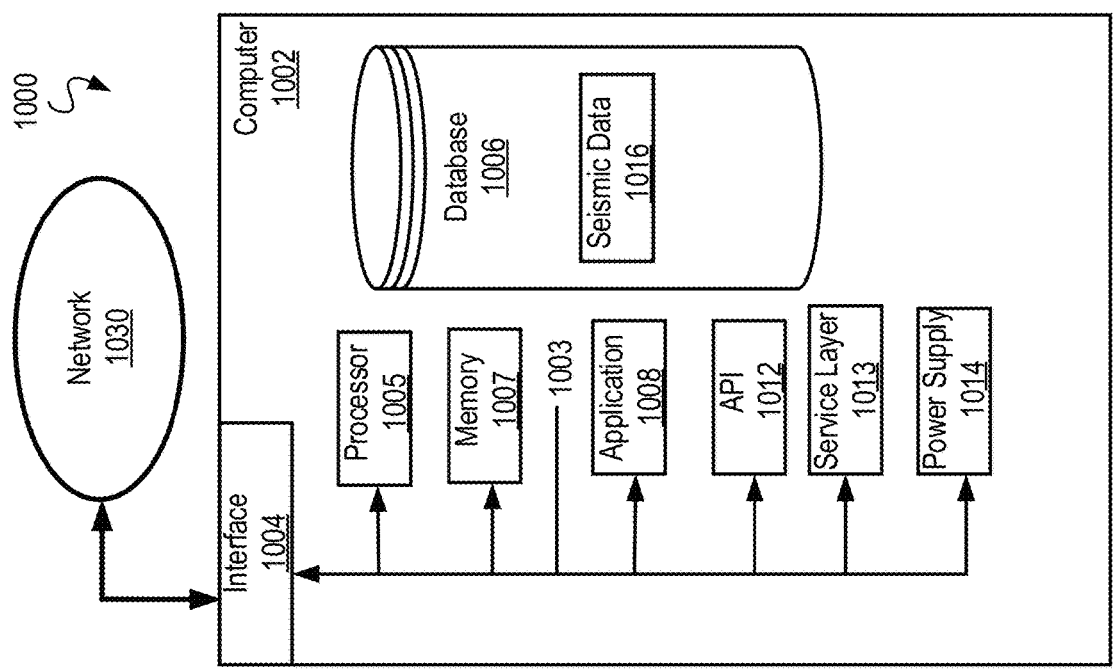
FIG. 10 is a block diagram of an example computer system used to provide computational functionalities associated with described algorithms, methods, functions, processes, flows, and procedures described in the present disclosure

FIG. 10 is a block diagram of an example computer system 1000 used to provide computational functionalities associated with described algorithms, methods, functions, processes, flows, and procedures described in the present disclosure (such as the method 200 described previously with reference to FIG. 2), according to some implementations of the present disclosure. The illustrated computer 1002 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI or GUI).

The computer 1002 can serve in a role as a client, a network component, a server, a database, a persistency, or components of a computer system for performing the subject matter described in the present disclosure. The illustrated computer 1002 is communicably coupled with a network 1030. In some implementations, one or more components of the computer 1002 can be configured to operate within different environments, including cloud-computing-based environments, local environments, global environments, and combinations of environments.

At a high level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1030 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus 1003. In some implementations, any or all of the components of the computer 1002, including hardware or software components, can interface with each other or the interface 1004 (or a combination of both), over the system bus 1003. Interfaces can use an application programming interface (API) 1012, a service layer 1013, or a combination of the API 1012 and service layer 1013. The API 1012 can include specifications for routines, data structures, and object classes. The API 1012 can be either computer-language independent or dependent. The API 1012 can refer to a complete interface, a single function, or a set of APIs.

The service layer 1013 can provide software services to the computer 1002 and other components (whether illustrated or not) that are communicably coupled to the computer 1002. The functionality of the computer 1002 can be accessible for all service consumers using this service layer. Software services, such as those provided by the service layer 1013, can provide reusable, defined functionalities through a defined interface. For example, the interface can be software written in JAVA, C++, or a language providing data in extensible markup language (XML) format. While illustrated as an integrated component of the computer 1002, in alternative implementations, the API 1012 or the service layer 1013 can be stand-alone components in relation to other components of the computer 1002 and other components communicably coupled to the computer 1002. Moreover, any or all parts of the API 1012 or the service layer 1013 can be implemented as child or sub-modules of another software module, enterprise application, or hardware module without departing from the scope of the present disclosure.

The computer 1002 includes an interface 1004. Although illustrated as a single interface 1004 in FIG. 10, two or more interfaces 1004 can be used according to particular needs, desires, or particular implementations of the computer 1002 and the described functionality. The interface 1004 can be used by the computer 1002 for communicating with other systems that are connected to the network 1030 (whether illustrated or not) in a distributed environment. Generally, the interface 1004 can include, or be implemented using, logic encoded in software or hardware (or a combination of software and hardware) operable to communicate with the network 1030. More specifically, the interface 1004 can include software supporting one or more communication protocols associated with communications. As such, the network 1030 or the interface's hardware can be operable to communicate physical signals within and outside of the illustrated computer 1002.

The computer 1002 includes a processor 1005. Although illustrated as a single processor 1005 in FIG. 10, two or more processors 1005 can be used according to particular needs, desires, or particular implementations of the computer 1002 and the described functionality. Generally, the processor 1005 can execute instructions and can manipulate data to perform the operations of the computer 1002, including operations using algorithms, methods, functions, processes, flows, and procedures as described in the present disclosure.

The computer 1002 also includes a database 1006 that can hold data for the computer 1002 and other components connected to the network 1030 (whether illustrated or not). For example, database 1006 can be an in-memory, conventional, or a database storing data consistent with the present disclosure. In some implementations, database 1006 can be a combination of two or more different database types (for example, hybrid in-memory and conventional databases)

according to particular needs, desires, or particular implementations of the computer 1002 and the described functionality. Although illustrated as a single database 1006 in FIG. 10, two or more databases (of the same, different, or combination of types) can be used according to particular needs, desires, or particular implementations of the computer 1002 and the described functionality. While database 1006 is illustrated as an internal component of the computer 1002, in alternative implementations, database 1006 can be external to the computer 1002.

The computer 1002 also includes a memory 1007 that can hold data for the computer 1002 or a combination of components connected to the network 1030 (whether illustrated or not). Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 (of the same, different, or combination of types) can be used according to particular needs, desires, or particular implementations of the computer 1002 and the described functionality. While memory 1007 is illustrated as an internal component of the computer 1002, in alternative implementations, memory 1007 can be external to the computer 1002.

The application 1008 can be an algorithmic software engine providing functionality according to particular needs, desires, or particular implementations of the computer 1002 and the described functionality. For example, application 1008 can serve as one or more components, modules, or applications. Further, although illustrated as a single application 1008, the application 1008 can be implemented as multiple applications 1008 on the computer 1002. In addition, although illustrated as internal to the computer 1002, in alternative implementations, the application 1008 can be external to the computer 1002.

The computer 1002 can also include a power supply 1014. The power supply 1014 can include a rechargeable or non-rechargeable battery that can be configured to be either user—or non-user-replaceable. In some implementations, the power supply 1014 can include power-conversion and management circuits, including recharging, standby, and power management functionalities. In some implementations, the power-supply 1014 can include a power plug to allow the computer 1002 to be plugged into a wall socket or a power source to, for example, power the computer 1002 or recharge a rechargeable battery.

There can be any number of computers 1002 associated with, or external to, a computer system containing computer 1002, with each computer 1002 communicating over network 1030. Further, the terms "client," "user," and other appropriate terminology can be used interchangeably, as appropriate, without departing from the scope of the present disclosure. Moreover, the present disclosure contemplates that many users can use one computer 1002 and one user can use multiple computers 1002.

In the previous description, for the purposes of explanation, numerous specific details are set forth in order to provide a thorough understanding of the present disclosure. However, the present disclosure may be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference is made in detail to implementations, examples of which are illustrated in the accompanying drawings. In the previous description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Several features are described that can each be used independently of one another or with any combination of other features. However, any individual feature may not address any of the problems discussed above or might only address one of the problems discussed above. Some of the problems discussed above might not be fully addressed by any of the features described in this specification. Although headings are provided, data related to a particular heading, but not found in the section having that heading, may also be found elsewhere in this description.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware—or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component (for example, as a data server), or that includes a middleware component (for example, an application server). Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising" or "further including" in the foregoing description or following claims, what follows this phrase can be an additional step or entity, or a sub-step/sub-entity of a previously-recited step or entity.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure.

What is claimed is:

1. A method for forming a microphysiological system (MPS) that includes a multi-organ construct platform, comprising:
   obtaining at least one organ construct corresponding to an organ type;
   generating, in the at least one organ construct, a disease;
   selecting a pharmacodynamics (PD) biomarker in the at least one organ construct based a type of the disease;
   causing an interaction between a molecular compound and the at least one organ construct;

measuring, with a biosensor included with the at least one organ construct, a response of the PD biomarker in the at least one organ construct to the interaction between the molecular compound and the at least one organ construct;

executing a machine learning model on data representing the response of the PD biomarker in the at least one organ construct and a concentration profile of the molecular compound in the at least one organ construct, the machine learning model being trained with training data relating molecular properties of the molecular compound, pharmacokinetic data of a set of other molecular compounds measured in an MPS, and pharmacokinetic data of the set of other molecular compounds measured in a human;

determining, based on execution of the machine learning model, a scaling factor of the at least one organ construct for the molecular compound, determining, based on the scaling factor, parameter values of the MPS, the parameter values indicating a relative size between the at least one organ construct and another organ construct and a geometry of the at least one organ construct; and constructing the multi-organ construct platform including the at least one organ construct having the relative size and the geometry indicated by the parameter values, wherein the multi-organ construct platform, when media is circulated through the at least one organ construct, emulates, based on the relative size and the geometry of the at least one organ construct, drug kinetics that are representative of a response profile in a human.

2. The method of claim 1, wherein generating, in the at least one organ construct, the disease comprises:
inducing a disease in the organ construct by applying an exogenous molecules to the organ construct or by causing cross-talking between the organ construct and another organ construct.

3. The method of claim 1, wherein generating, in the at least one organ construct, the disease comprises:
introducing one or more diseased cells to the organ construct.

4. The method of claim 1, wherein the at least one organ construct comprises at least two tissue types.

5. The method of claim 1, wherein the at least one organ construct comprises two or more compartments, wherein a compartment of the two or more compartments comprises an integrated biosensor.

6. The method of claim 5, wherein the integrated biosensor comprises one or more of a biochemical sensor and an electrochemical sensor.

7. The method of claim 1, further comprising:
determining a dose-response curve relating an amount of the molecular compound to a change in the PD biomarker.

8. The method of claim 1, wherein the parameter values indicate a tissue size.

9. The method of claim 1, wherein the type of the disease comprises cancer and the at least one organ construct comprises cancerous cells;
wherein the type of the-disease comprises Parkinson's disease and the at least one organ construct comprises neurons;
wherein the type of the-disease comprises a neuroinflammatory disease and the at least one organ construct comprises brain cells; or
wherein the type of the-disease comprises non-alcoholic steatohepatitis and wherein the at least one organ construct comprises one or more of liver cells, adipose cells, and pancreas cells.

10. The method of claim 1, further comprising determining at least one PD parameter by analyzing the interaction between the molecular compound and the at least one organ construct using at least one ordinary differential equation.

11. The method of claim 1, further comprising:
determining, for the at least one organ construct, at least one parameter of that organ construct, wherein the at least one parameter is determined based on the type of the disease.

12. The method of claim 1, further comprising:
obtaining, based on the interaction between a molecular compound and the at least one organ construct, at least one pharmacokinetic (PK) parameter for the organ construct,
wherein at least one of the parameter values is further based on the at least one PK parameter for the at least one organ construct.

13. The method of claim 12, further comprising:
determining, for the at least one organ construct, a concentration profile based on the interaction between a molecular compound and the at least one organ construct,
wherein at least one PK parameter for the organ type is based on the concentration profile.

14. The method of claim 12, wherein the at least one PK parameter comprises at least one of: a clearance, a permeability, and a volume of distribution.

15. The method of claim 1, wherein the at least one organ construct comprises at least one of: a gastrointestinal tract organ construct, a liver organ construct, a kidney organ construct, a muscle organ construct, or an adipose organ construct.

16. The method of claim 1, wherein the molecular compound comprises a xenobiotic.

17. The method of claim 1, wherein the parameter values indicate at least one of: a volume of the at least one organ construct, a surface area of the at least one organ construct, a number of cells of the at least one organ construct, an arrangement of cells of the at least one organ construct, a flow pattern through the at least one organ construct, a volume of at least one channel, a flow rate, and a flow partitioning value.

18. The method of claim 1, further comprising:
applying an ordinary differential equation (ODE) model to at least one PD parameter associated with the at least one organ construct based on in vitro experimental data;
translating, based on applying the ODE model, the at least one PD parameter to PD profile data representing an in vivo PD result.

19. The method of claim 18, further comprising:
applying an ordinary differential equation (ODE) model to at least one PK parameter, in addition to the PD parameter, based on in vitro experimental data;
translating, based on applying the ODE model, the at least one PK parameter to PK profile data representing an in vivo PK result in addition to the in vivo PD result.

20. The method of claim 1, wherein constructing the multi-organ construct platform comprising the at least one organ construct having the geometry and the relative size to the other organ construct comprises connecting the at least one organ construct to the other organ construct and to a pump by microfluidic channels, wherein the pump, when active, causes the molecular compound to flow in a media between the at least one organ construct and the other organ construct at a predetermined system level flow rate.

* * * * *